US008841383B2

(12) United States Patent
Rodgers et al.

(10) Patent No.: US 8,841,383 B2
(45) Date of Patent: Sep. 23, 2014

(54) ETHYLENE-PROPYLENE TERPOLYMERS IN TIRE SIDEWALLS

(75) Inventors: Michael B. Rodgers, Seabrook, TX (US); Sunny Jacob, Seabrook, TX (US); Michael C. Bulawa, Houston, TX (US); Bharat B. Sharma, Bangalore (IN); Nitin K. Tambe, Bangalore (IN)

(73) Assignee: ExxonMobil Chemical Patents Inc., Houston, TX (US)

( * ) Notice: Subject to any disclaimer, the term of this patent is extended or adjusted under 35 U.S.C. 154(b) by 743 days.

(21) Appl. No.: 11/934,562

(22) Filed: Nov. 2, 2007

(65) Prior Publication Data

US 2009/0115108 A1    May 7, 2009

(51) Int. Cl.
| | |
|---|---|
| *C08L 23/16* | (2006.01) |
| *C08L 7/00* | (2006.01) |
| *C08L 19/00* | (2006.01) |
| *B60C 1/00* | (2006.01) |
| *C08L 23/14* | (2006.01) |
| *C08L 23/20* | (2006.01) |
| *C08L 21/00* | (2006.01) |
| *C08L 9/00* | (2006.01) |

(52) U.S. Cl.
CPC ................ *C08L 21/00* (2013.01); *C08L 23/16* (2013.01); *C08L 23/145* (2013.01); *C08L 23/20* (2013.01); *C08L 9/00* (2013.01); *B60C 1/0025* (2013.01); *C08L 7/00* (2013.01); *B60C 2200/14* (2013.01)
USPC ........... 525/240; 525/191; 525/232; 525/237; 525/241

(58) Field of Classification Search
CPC ......... C08L 21/00; C08L 23/22; C08L 23/16; C08L 23/20; C08L 7/00; C08L 9/00; C08L 9/06; C08L 11/00; C08L 2312/00; C08L 2205/035; C08L 2207/324; C08L 2202/025; B60C 1/0025; B60C 2200/02; B60C 2200/10; B60C 2200/04
USPC .................. 525/191, 232, 240, 235, 237, 241
See application file for complete search history.

(56) References Cited

U.S. PATENT DOCUMENTS

| | | | | |
|---|---|---|---|---|
| 3,897,405 | A * | 7/1975 | Son et al. ................ | 525/331.8 |
| 4,465,829 | A * | 8/1984 | Graves ..................... | 524/432 |
| 6,245,856 | B1 | 6/2001 | Kaufman et al. | |
| 6,525,157 | B2 | 2/2003 | Cozewith et al. | |
| 2005/0107529 | A1 | 5/2005 | Datta et al. | |
| 2005/0107530 | A1 | 5/2005 | Datta et al. | |
| 2005/0107534 | A1 | 5/2005 | Datta et al. | |
| 2005/0131142 | A1 | 6/2005 | Datta et al. | |

FOREIGN PATENT DOCUMENTS

| | | |
|---|---|---|
| EP | 0 946 640 | 12/1997 |
| EP | 1 003 814 | 7/1998 |
| WO | WO 98/31283 | 7/1998 |
| WO | WO 00/69963 | 11/2000 |
| WO | WO 00/69964 | 11/2000 |
| WO | WO 2005/049670 | 6/2005 |
| WO | WO 2005/049671 | 6/2005 |
| WO | WO 2005/049672 | 6/2005 |
| WO | WO-2007/070053 A1 * | 6/2007 |

OTHER PUBLICATIONS

Sahakaro et al, Journal of Applied Polymer Science vol. 103, issue 4 pp. 2538-2546 published online Nov. 27, 2006.*
Rubber Technology, Third Edition, 1995 Chapman & Hall, pp. 263-266.
Sahnoune, A. et al., "*Thermal Transitions and Rheology of Propylene-Ethylene-Based Terpolymers*" ANTEC 2006, pp. 2674-2678.
G. Ver Strate, "Ethylene-Propylene Elastomers," Encyclopedia of Polymer Science and Engineering, vol. 6 (1986), pp. 522-544.

\* cited by examiner

*Primary Examiner* — Irina S Zemel
*Assistant Examiner* — Jeffrey Lenihan

(57) ABSTRACT

Disclosed is an ethylene-propylene-diene terpolymer having isotactic polypropylene crystallinity compounded with a blend rubber wherein the terpolymer can be present in an amount effective to improve tack, aged tensile strength retention, fatigue resistance, ozone cracking resistance, and reversion resistance. Also disclosed is an elastomer composition wherein the terpolymer can have at least 60 wt % propylene-derived units, at least 6 wt % ethylene-derived units and from 0.3 to 10 wt % diene-derived units, and a tire sidewall composition comprising from 10 to 30 phr terpolymer, from 20 to 60 phr natural rubber, from 20 to 60 phr polybutadiene rubber, and an optional secondary blend rubber. Also disclosed is a vulcanizate of the elastomer composition, and articles, tire sidewalls, tires, retreaded tires, bias truck tires, off-road tires, and passenger automobile tires made with the vulcanizate. Further disclosed are processes for making molded articles and tires, and for retreading tires.

17 Claims, 4 Drawing Sheets

ETHYLENE-PROPYLENE TERPOLYMERS IN TIRE SIDEWALLS

FIELD OF THE INVENTION

The present invention relates to compositions and tire sidewalls that can have improvements in resistance to aging, resistance to ozone, tack, reversion resistance, resistance to cracking, and/or fatigue life, and more particularly to such compositions and tire sidewalls containing an elastomeric polyolefin terpolymer with isotactic crystallinity.

BACKGROUND OF THE INVENTION

The tire sidewall is an outer rubber layer that protects that region of the tire from impact and curb scuffing, and provides long-term weathering protection and casing durability. It is formulated to protect the ply, and must possess resistance to weathering, ozone, tearing and both radial and circumferential cracking, while simultaneously providing flex fatigue resistance.

A blend of natural rubber ("NR") and butadiene rubber has generally been used in the sidewall along with carbon black, a vulcanization system, and a high concentration of antidegradants designed to provide additional resistance to environmental and aging. Natural rubber and polybutadiene, when compounded together, can form two domains. In a tire sidewall compound containing natural rubber and polybutadiene, one rubber will form a continuous phase with dispersed domains of the other rubber serving to arrest any cut growth through the continuous phase. Typically, NR is the continuous phase, although phase inversion can occur. This mixed composition shows better resistance to fatigue and cut growth than if only one rubber is used.

Other problems in tire sidewall formulations arise depending on the specific application. For example, high performance tires for luxury vehicles have the additional requirement of good surface appearance throughout the tire life cycle without loss in durability. Furthermore, commercial truck tires are frequently re-treaded, and the tire sidewall therefore sees extended service life and undergoes excessive heat history, both in service and during the retread vulcanization process. This necessitates good compound aged property retention. A similar point can be made for off-road tires such as those on large dump trucks which have a ton-km-per-hour (TKPH) [0.73 ton-miles-per-hour (TMPH)] rating, where TKPH is the product of the average tire load times the average vehicle speed and the tire TKPH rating is the maximum TKPH at which the tire can be operated to avoid premature tire wear due to excessive heat. Improvements to heat resistance of the rubber compounds used in the sidewall would thus be beneficial for commercial truck tires and off-road tires.

Chemical protectants, such as waxes, antioxidants, and antiozonants, are typically added to the sidewall formulations at optimized levels for effectiveness under both static and dynamic conditions. However, the waxes and antiozonants are continually depleted from the sidewall surface by reaction with ozone, and by physical mechanisms such as curb scuffing and washing. In addition, the chemical antiozonants for rubber are generally costly, staining materials. N,N'-disubstituted-para-phenylenediamines are the most effective antiozonants, particularly the alkyl-, aryl-substituted versions such as N-1,3-dimethylbutyl-N-phenyl-para-phenylene diamine ("6PPD"), for example. Surface discoloration is a particular problem when using 6PPD. It would be desirable to reduce or eliminate expensive antiozonants such as 6PPD while still achieving a black sidewall with good surface appearance and without loss in durability performance over the life of a tire.

Elastomeric compositions having isotactic polypropylene crystallinity, a melting point by DSC of 110° C. or less, a heat of fusion of from 5 to 50 J/g, and comprising at least 60 wt % propylene-derived units, at least 6 wt % ethylene-derived units, and optionally diene-derived units, are described in U.S. Patent Application Publication Nos. (hereinafter "U.S. App.") 2005/0107529, 2005/0107530, 2005/0107534, 2005/0131142 and International Patent Application Publication Nos. (hereinafter indicated by the "WO" indicator) WO 2005/49670, WO 2005/49671 and WO 2005/49672. Amorphous and partially crystalline (generally referred to as semi-crystalline) polymers can provide elastomeric properties as defined, for example, in ASTM D1566. An important class of elastomers is derived from polyolefins, generally using addition polymerization with a Ziegler-Natta type catalyst system. Some polyolefin elastomers are interpolymers of ethylene, a crystallinity-disrupting α-olefin such as propylene, which provides short chain branches, and optionally small amounts of a polyene, such as a diene, to provide unsaturated short chain branches useful in providing crosslinks between different chains. These interpolymers may be ethylene propylene copolymers ("EP") not containing units derived from diene, or ethylene propylene diene terpolymers ("EPDM").

European Patent Nos. (hereinafter indicated by the "EP" indicator) EP 1003814 B1, 946641 A1 and 946640 B1 and U.S. Pat. Nos. (hereinafter "U.S.") 6,245,856 and 6,525,157, and others disclose polyolefin interpolymers that are elastomers and have crystallinity formed by isotactically-arranged propylene-derived sequences in the polymer chain. This is in contrast with the EP and EPDM interpolymers in current commercial use wherein crystallinity is due to ethylene-derived sequences. The properties of elastomers having crystallinity arising from the microstructure of the propylene units are different in many aspects from known EP and EPDM interpolymer elastomers. Use of dienes for these new propylene-based elastomers has been contemplated. See, for example, WO 2000/69964, including at page 15, lines 18 to 25. Another background reference includes WO 2000/69963.

SUMMARY OF THE INVENTION

The present invention uses an ethylene-propylene-diene terpolymer having isotactic polypropylene crystallinity as a compounding additive in a rubber blend to improve tack, aged tensile strength retention, fatigue resistance, ozone cracking resistance, reversion resistance and/or the like. When the composition is used in a tire sidewall according to an embodiment, the composition can benefit tire building and curing, long term durability, appearance and retreadability.

Broadly, one embodiment provides a rubber blend comprising an ethylene-propylene-diene terpolymer having isotactic polypropylene crystallinity compounded in an effective amount with a blend rubber to improve tack, aged tensile strength retention, fatigue resistance, ozone cracking resistance and reversion resistance. Said effective amount being preferably from 5 to 40 phr of the terpolymer, more preferably from 10 to 30 phr terpolymer.

In one embodiment, the invention provides an elastomer composition including a blend of an ethylene-propylene-diene terpolymer having at least 60 wt % propylene-derived units, at least 6 wt % ethylene-derived units and from 0.3 to 10 wt % diene-derived units, based on the total weight of propylene-derived units, ethylene-derived units and diene-derived units, wherein the terpolymer has a melting point by DSC equal to or less than 110° C. and a heat of fusion of from 5 J/g to 50 J/g, with a blend rubber.

In an embodiment, the terpolymer can comprise from 80 to 95 wt % of propylene-derived units; from 5 to 20 wt % of ethylene-derived units; and/or from 0.5 to 4 wt %, preferably from 1 to 3 wt % or from 0.5 to 1.5 wt %, of diene-derived units. The diene-derived units can be selected from 5-ethylidene-2-norbornene ("ENB"), 5-vinyl-2-norbornene ("VNB"), dicyclopentadiene, 1,4-hexadiene, and the like.

In an embodiment, the terpolymer has a Mooney viscosity ML (1+4) at 125° C. of from 1 to 100, preferably from 5 to 40. The terpolymer can be partially insoluble and the fractions soluble at 23° C. and 31° C., as measured by the extraction method described herein, have ethylene contents differing by 5 wt % or less, preferably 2 wt % or less. The terpolymer can have an isotactic propylene triad tacticity of from 65 to 95%. The terpolymer can have a tacticity index, also known as the m/r ratio as defined below, of from 6 to 8. The terpolymer can have an isotacticity index of from 40 to 55.

In an embodiment, the blend can comprise from 5 to 40 phr of the terpolymer, preferably from 10 to 30 phr.

The blend rubber can include one or more than one rubber (the second or more rubber being referred to as "secondary rubbers") selected from natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), butyl rubber, star branched butyl rubber ("SBBR"), poly(isobutylene-co-alkylstyrene), polychloroprene rubber, nitrile rubber, ethylene-propylene rubber ("EPM"), ethylene-propylene-diene rubber ("EPDM"), mixtures thereof and the like. In an embodiment, the blend rubber can include a mixture of at least two of these elastomers. In an embodiment, the blend rubber(s) can contain halogen either by halogenation of the polymer or polymerization of halogen-containing monomers, e.g., polychloroprene, chlorobutyl rubber, bromobutyl rubber, brominated or chlorinated star branched butyl rubber, etc.

In one embodiment, the blend rubber can comprise a mixture of natural rubber and polybutadiene rubber. The natural rubber being present at from 5 to 80 phr and the polybutadiene rubber at from 5 to 80 phr.

In an embodiment, the elastomer composition can further comprise a filler, for example, selected from carbon black, modified carbon black, silica, precipitated silica, and the like, and blends thereof. In an embodiment, the elastomer composition can further comprise a chemical protectant, for example, selected from waxes, antioxidants, antiozonants, and the like, and combinations thereof. In an embodiment, the elastomer composition can further comprise a processing oil, resin, or the like, and combinations thereof. In an embodiment, the elastomer composition can further comprise a curing package.

Another embodiment of the invention provides the vulcanizate obtained by curing the elastomer composition described above. The blend can include the terpolymer in an amount effective as an antiozonant. The vulcanizate can be substantially free of staining as determined in accordance with ASTM D-925. The vulcanizate in one embodiment can have a reduced level, be substantially free of or be free of N,N'-disubstituted-para-phenyldiamines.

In another embodiment, the invention provides an article comprising the vulcanizate. The article can be a tire sidewall, for example, or a tire made with the sidewall comprising the vulcanizate. The tire can further include retreads. In various embodiments, the tire can be a bias truck tire, an off-road tire, or a luxury passenger automobile tire.

Another embodiment of the invention provides a process for making a molded article. The process comprises melt mixing the elastomeric composition described above, shaping the mixture into an article, and curing the shaped article to covulcanize the terpolymer and the blend rubber.

Another embodiment of the invention provides a process for making a tire. The process comprises melt mixing the elastomeric composition described above, shaping the mixture into a sidewall in a tire build comprising a carcass and a tread, and curing the build to form the tire. In an embodiment, the process can include retreading the tire.

A further embodiment provides a tire sidewall composition comprising a curable composition or vulcanizate of from 10 to 30 phr ethylene-propylene-diene terpolymer comprising from 80 to 95 wt % of propylene-derived units, at least from 5 to 20 wt % ethylene-derived units and from 0.5 to 4 wt % diene-derived units selected from 5-ethylidene-2-norbornene, 5-vinyl-2-norbornene, dicyclopentadiene, and 1,4-hexadiene, based on the total weight of propylene-derived units, ethylene-derived units and diene-derived units, wherein the terpolymer has isotactic polypropylene crystallinity, a melting point by DSC equal to or less than 110° C., and a heat of fusion of from 5 J/g to 50 J/g, a Mooney viscosity ML(1+4) at 125° C. of from 5 to 40, an isotactic propylene triad tacticity of from 65 to 95%; from 20 to 60 phr natural rubber; from 20 to 60 phr polybutadiene rubber; an optional secondary blend rubber selected from IR, SBR, IBR, SIBR, butyl rubber, SBBR, poly(isobutylene-co-alkylstyrene), EPM, EPDM and mixtures thereof, a filler selected from carbon black, modified carbon black, silica, precipitated silica, and blends thereof, a chemical protectant selected from waxes, antioxidants, antiozonants and combinations thereof, an optional processing oil, resin, or combination thereof, and a curing package.

DETAILED DESCRIPTION OF THE INVENTION

Definitions and Test Methods

Figure 1:
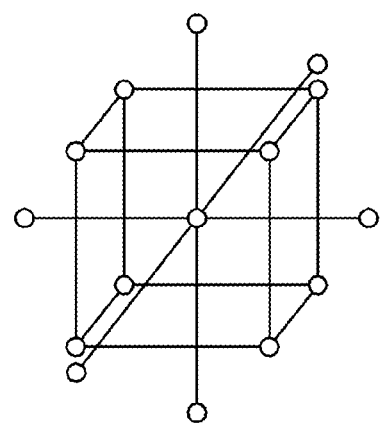
FIG. 1 illustrates a three-variable standard central composite design space approach for the development of statistical mapping data, according to an embodiment of the invention.

In reference to Periodic Table "Groups," the new numbering scheme for the Periodic Table Groups is used as found in HAWLEY'S CONDENSED CHEMICAL DICTIONARY, p. 852 (13th ed. 1997).

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand. Likewise, when catalyst components are described as comprising neutral stable forms of the components, it is well understood by one skilled in the art, that the ionic form of the component is the form that reacts with the monomers to produce polymers.

Comonomer content: The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, APPLIED SPECTROSCOPY, 1993, vol. 47, pp. 1128-1130.

In the particular case of propylene-ethylene copolymers containing greater than 75 wt % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 $cm^{-1}$ to 4000 $cm^{-1}$ is recorded and the monomer weight percent of ethylene can be calculated according to the following equation: Ethylene wt %=$82.585-111.987X+30.045X^2$, where X is the ratio of the peak height at 1155 $cm^{-1}$ and peak height at either 722 $cm^{-1}$ or 732 $cm^{-1}$, whichever is higher.

In the case of propylene-ethylene-polyene or -diene terpolymers, the amount of polyene or diene comonomer present can be inferred by the quantitative measure of the amount of the pendant free olefin present in the polymer after polymerization. Several procedures such as iodine number and the determination of the olefin content by $H^1$ or $^{13}C$ NMR have been established. In embodiments described herein where the polyene is ENB, the amount of polyene present in the polymer can be measured using ASTM D3900.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent." Elastomer is a term that may be used interchangeably with the term rubber.

Elastomeric composition refers to any composition comprising at least one elastomer as defined above.

A vulcanized rubber compound by ASTM D1566 definition refers to "a crosslinked elastic material compounded from an elastomer, susceptible to large deformations by a small force capable of rapid, forceful recovery to approximately its original dimensions and shape upon removal of the deforming force." A cured elastomeric composition refers to any elastomeric composition that has undergone a curing process and/or comprises or is produced using an effective amount of a curative or cure package, and is a term used interchangeably with the term vulcanized rubber compound.

A thermoplastic elastomer by ASTM D1566 definition refers to a rubber-like material "that repeatedly can be softened by heating and hardened by cooling through a temperature range characteristic of the polymer, and in the softened state can be shaped into articles." Thermoplastic elastomers are microphase separated systems of at least two polymers. One phase is the hard polymer that does not flow at room temperature, but becomes fluid when heated, that gives thermoplastic elastomers its strength. The other phase is a soft rubbery polymer that gives thermoplastic elastomers their elasticity. The hard phase is typically the major or continuous phase, also referred to as the matrix.

A thermoplastic vulcanizate by ASTM D1566 definition refers to "a thermoplastic elastomer with a chemically cross-linked rubbery phase, produced by dynamic vulcanization." Dynamic vulcanization is "the process of intimate melt mixing of a thermoplastic polymer and a suitable reactive rubbery polymer to generate a thermoplastic elastomer with a chemically cross-linked rubbery phase . . . " The rubbery phase, whether or not cross-linked, is typically the minor or dispersed phase.

The term phr is parts per hundred rubber by weight or "parts," and is a measure common in the art wherein components of a composition are measured relative to a total of all of the elastomer components. The total phr or parts for all rubber components, whether one, two, three, or more different rubber components is present in a given recipe is always defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s). For purposes of this specification, when phr is used with respect to the presence of the propylene-ethylene-diene terpolymer, the reference is made with respect to the total amount of both terpolymer and all blend rubber components (one or more than one). Thus, for example, if an elastomer composition is composed of 40 phr propylene-ethylene-diene terpolymer, then there would be a total of 100−40=60 parts by weight of additional elastomer available to complete the elastomer composition. The additional 60 parts being composed of blend rubber or other rubber constituents added to the elastomer composition.

Isoolefin refers to any olefin monomer having at least one carbon having two substitutions on that carbon.

Multiolefin or polyene refers to any monomer having two or more double bonds. In a preferred embodiment, when present in isobutylene polymers, the multiolefin employed is any monomer comprising two conjugated double bonds such as a conjugated diene like isoprene.

Isobutylene based elastomer or polymer refers to elastomers or polymers comprising at least 70 mol % repeat units from isobutylene.

Hydrocarbon refers to molecules or segments of molecules containing primarily hydrogen and carbon atoms. In some embodiments, hydrocarbon also includes halogenated versions of hydrocarbons and versions containing heteroatoms as discussed in more detail below.

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Isotactic: The term "isotactic" is defined herein as a polymer sequence in which greater than 50% of the pairs of pendant methyl groups located on adjacent propylene units, which are inserted into the chain in a regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer. The triad tacticity of the polymers described herein can be determined from a $^{13}C$ NMR spectrum of the polymer as described below and as described in U.S. Pat. No. 5,504,172.

Tacticity Index: The tacticity index, expressed herein as "m/r," is determined by $^{13}C$ NMR. The tacticity index m/r is calculated as defined in H. N. Cheng, *Macromolecules*, 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

Melting point and heat of fusion: The melting point ("Tm") and heat of fusion of the polymers described herein can be determined by Differential Scanning Calorimetry ("DSC"), using the ASTM E-794-95 procedure. About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

Stress strain measurements: The stress-strain elongation properties of the cured compounds described herein can be measured according to the ASTM D412 procedure.

Extraction in refluxing xylene: Solubility in refluxing xylene is a measurement of the amount of insoluble and unextractible propylene-based elastomer. The process for determining solubility in xylene is as follows. A sample weighing approximately 2 grams is weighed, and the weight is recorded as $W_1$. The sample is exposed to 50 ml of refluxing xylene in an extraction apparatus maintained at or near 140° C. by the refluxing solvent. After 24 hours of extraction, the solvent is decanted off and 50 ml of new solvent is added and the extraction is conducted under identical conditions for another 24 hours. At the end of this period, the sample is removed and dried in a vacuum oven at 100° C. for 24 hours. The sample is then cooled and weighed for a final weight which is recorded as $W_2$. The fraction of the polymer insoluble in xylene at reflux is determined by the following formula: % crosslinked (also referred to herein as % cured), by extraction=$100 \times [W_2(1-F_{Fi})]/[W_1(1-F_S-F_P-F_{Fi})]$, where $F_S$ is the weight fraction of crystalline polymer component present in the composition, $F_P$ is the weight fraction of plasticizer, process oil, and other low molecular weight materials present in the composition which are extractible in refluxing xylene, and $F_{Fi}$ is the weight fraction of filler and other inorganic material present in the composition which are normally inextractible in refluxing xylene.

Die B and Die C tear: Die B and Die C tear properties are reported in lb/in. according to the ASTM D624 version 00 procedures. The data herein are for peak force and the average of three samples is reported as the average data. The data may be multiplied by 0.175 to convert the units from lb/in. to kN/m.

Mooney viscosity: Mooney viscosity, as used herein, is measured as ML (1+4)@125° C. according to ASTM D-1646.

Meltflow rate and melt index. The determination of the Melt Flow Rate ("MFR") and the Melt Index ("MI") of the polymer are according to ASTM D-1238 using modification 1 with a load of 2.16 kg. In this version of the method a portion of the sample extruded during the test was collected and weighed. The sample analysis is conducted at 230° C. with a 1 minute preheat on the sample to provide a steady temperature for the duration of the experiment. This data expressed as dg of sample extruded per minute is indicated as MFR. In an alternative procedure, the test is conducted in an identical fashion except at a temperature of 190° C. This data is referred to as MI@190° C.

Shore A and Shore D hardness The determination of the Shore A and Shore D hardness of the polymer is according to ASTM D 2240. In this version of the method a portion of the sample is tested at room temperature. The data are recorded 3 seconds after the indentation is created in the sample.

Ethylene-Propylene-Diene Terpolymer

The terpolymer is a propylene-based elastomer that can provide an improved rubber formulation containing such propylene-based elastomer to provide appearance and end use performance characteristics not achievable with EP and EPDM interpolymer elastomers.

In one embodiment, the terpolymer includes propylene-derived units, ethylene-derived units, and diene-derived units, and can have isotactic polypropylene crystallinity, a melting point by DSC equal to or less than 110° C., and a heat of fusion of from 5 J/g to 50 J/g. The propylene-derived units can be present in an amount of at least 60 wt %, based on the combined weight of units derived from propylene, diene, and ethylene. The ethylene-derived units can be present in an amount of at least 6 wt %, based on the combined weight of units derived from propylene, diene, and ethylene. The diene-derived units can be present in an amount within the range of from 0.3 to 10 wt %, based on the combined weight of units derived from propylene, diene, and ethylene.

The propylene-based elastomer of the present invention can be a random propylene homopolymer or copolymer having crystalline regions interrupted by non-crystalline regions. The non-crystalline regions may result from regions of non-crystallizable polypropylene segments and/or the inclusion of comonomer units. The crystallinity and the melting point of the propylene-based elastomer are reduced compared to highly isotactic polypropylene by the introduction of errors in the insertion of propylene and/or by the presence of comonomer.

The crystallinity of the propylene-based elastomer may be expressed in terms of heat of fusion. In particular embodiments, the propylene-based elastomer can have a heat of fusion, as determined by DSC, ranging from a lower limit of 1.0 J/g, or 1.5 J/g, or 3.0 J/g, or 4.0 J/g, or 5.0 J/g, or 6.0 J/g, or 7.0 J/g, to an upper limit of 30 J/g, or 40 J/g, or 50 J/g, or 60 J/g, or 75 J/g. The crystallinity of the propylene-based elastomer can also be expressed in terms of crystallinity percent. The thermal energy for the highest order of polypropylene is estimated at 189 J/g. That is, 100% crystallinity is equal to 189 J/g. Therefore, in particular embodiments, the propylene-based elastomer has a propylene crystallinity within the range having an upper limit of 65%, or 40%, or 30%, or 25%, or 20%, and a lower limit of 1%, or 3%, or 5%, or 7%, or 8%.

The level of crystallinity is also reflected in the melting point. In particular embodiments, the propylene-based elastomer has a melting point by DSC ranging from an upper limit of 110° C., or 105° C., or 90° C., or 80° C., or 70° C. to a lower limit of 0° C., or 20° C., or 25° C., or 30° C., or 35° C., or 40° C., or 45° C.

The propylene-based elastomer generally comprises at least 60 wt % propylene-derived units, and in particular embodiments, the propylene-based elastomer comprises at least 75 wt %, or at least 80 wt %, or at least 90 wt % propylene-derived units. Propylene-based elastomers suitable in the present invention have an isotactic propylene triad tacticity within the range having a lower limit of 65%, or 70%, or 75% to an upper limit of 95%, or 97%, or 98%, or 99%.

The propylene-based elastomer in the rubber blend of the invention can have an isotacticity index greater than 0%, or within the range having an upper limit of 50%, or 25% and a lower limit of 3%, or 10%. The propylene-based elastomer of the invention can have a tacticity index (m/r) within the range having an upper limit of 8, or 10, or 12, and a lower limit of 4, or 6.

In some embodiments, the crystallinity of the propylene-based elastomer is reduced by the copolymerization of propylene with limited amounts of one or more comonomers selected from: ethylene, $C_4$-$C_{20}$ alpha-olefins, and polyenes. In these copolymers, the amount of propylene-derived units present in the propylene-based elastomer ranges from an upper limit of 99.9 wt %, or 97 wt %, or 95 wt %, or 94 wt %, or 92 wt %, or 90 wt %, or 85 wt % to a lower limit of 60 wt %, 68 wt %, or 70 wt %, or 71 wt %, or 75 wt %, or 76 wt %, or 80 wt %, based on the total weight of the propylene-based elastomer. The amount of optional units derived from ethylene and/or $C_4$-$C_{20}$ alpha-olefins present in the propylene-based elastomer ranges from an upper limit of 40 wt %, or 35 wt %, or 30 wt %, or 28 wt %, or 25 wt %, or 20 wt %, or 15 wt % to a lower limit of 0 wt %, or 0.5 wt %, or 1 wt %, or 2 wt %, or 3 wt %, or 5 wt %, or 6 wt %, or 8 wt %, or 10 wt %, based on the total weight of the propylene-based elastomer. The amount of optional polyene-derived units present in the propylene-based elastomer ranges from an upper limit of 25 wt %, or wt %, or 15 wt %, or 10 wt %, or 7 wt %, or 5 wt %, or 4.5 wt %, or 3 wt %, or 2.5 wt %, to a lower limit of 0 wt %, or 0.1 wt %, or 0.2 wt %, or 0.3 wt %, or 0.5 wt %, or 1 wt %, or 1.5 wt % based on the total weight of the propylene-based elastomer.

Non-limiting examples of preferred α-olefin(s) optionally present in the propylene-based elastomer include propylene, 1-butene, 1-pentene, 1-hexene, 1-octene, and 1-dodecene. The polyene-derived units optionally present in the propylene-based elastomer may be derived from any hydrocarbon structure having at least two unsaturated bonds wherein at least one of the unsaturated bonds may be incorporated into a polymer. Non-limiting examples of preferred polyenes include ENB, VNB, divinyl benzene ("DVB"), and dicyclopentadiene ("DCPD").

In a particular embodiment, the propylene-based elastomer can have a Mooney viscosity ML (1+4) at 125° C. of from 0.5 to 100, or from 5 to 40, or from 10 to 40.

The propylene-based elastomer of the invention can have a weight average molecular weight ("$M_w$") within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ ("MWD"), sometimes referred to as a "polydispersity index" ("PDI"), within the range having an upper limit of 40, or 20, or 10, or 5, or 4.5, or 4.0, or 3.2, or 3.0, and a lower limit of 1.5, or 1.8, or 2.0.

Illustrative non-limiting examples of suitable propylene-based elastomers, as well as the methods for preparing them, include the "FPC" disclosed in pending U.S. Patent Application Ser. No. 60/519,975; the "isotactic propylene copolymer" disclosed in U.S. App. 2003/0204017; the "propylene ethylene copolymers" disclosed in U.S. Pat. No. 6,525,157; and the "propylene ethylene copolymers" disclosed in WO 02/083754.

Separate from, or in combination with the foregoing, the crystallinity of the propylene-based elastomer can be reduced also by stereo-irregular incorporation of the propylene-derived units, which can be influenced by, for example, the choice of catalyst and polymerization temperature.

The propylene-based elastomers of the present invention are not limited by any particular polymerization method of preparation, and the polymerization processes described herein are not limited by any particular type of reaction vessel. In a particular embodiment, the catalyst system used to produce the propylene-based elastomer includes one or more transition metal compounds and one or more activators. When alumoxane or aluminum alkyl activators are used, the combined pre-catalyst-to-activator molar ratio is generally from 1:5000 to 10:1. When ionizing activators are used, the combined pre-catalyst-to-activator molar ratio is generally from 10:1 to 1:10. Multiple activators may be used, including using mixtures of alumoxanes or aluminum alkyls with ionizing activators.

In another embodiment, the catalyst system includes a bis(cyclopentadienyl) metal compound and either (1) a non-coordinating compatible anion activator, or (2) an alumoxane activator. Non-limiting examples of such catalyst systems are described in U.S. Pat. No. 5,198,401 and U.S. Pat. No. 5,391,629.

In another embodiment, the propylene-based elastomer is made in the presence of an activating cocatalyst which is a precursor ionic compound comprising a halogenated tetra-aryl-substituted Group 13 anion wherein each aryl substituent contains at least two cyclic aromatic rings. In a particular aspect of this embodiment, the propylene-based elastomer contains greater than 0.2 parts per million, or greater than 0.5 parts per million, or greater than 1 part per million, or greater than 5 parts per million of the residues of the activating cocatalyst.

In another particular embodiment, the catalyst system used to produce the propylene-based elastomer includes an Hfcontaining metallocene catalyst, such as, but not limited to, dimethyl silyl bis(indenyl)hafnium dimethyl, and a non-coordinating anion activator, such as, but not limited to, dimethyl anilinium tetrakis(heptafluoronaphthyl)borate. In yet another particular embodiment, the propylene-based elastomer is produced using any of the catalyst systems and polymerization methods disclosed in U.S. App. 2004/0024146. In yet another particular embodiment, the propylene-based elastomer is produced using a catalyst system such as one of the nonmetallocene, metal-centered, heteroaryl ligand catalyst systems described in U.S. App. 2003/0204017.

Further general process condition information suitable for use in preparing the propylene-based elastomer can be found in disclosures including, but not limited to U.S. Pat. No. 5,001,205, WO 1996/33227 and WO 1997/22639. Further information on gas phase polymerization processes can be found in disclosures including, but not limited to U.S. Pat. Nos. 4,543,399, 4,588,790, 5,028,670, 5,317,036, 5,352,749, 5,405,922, 5,436,304, 5,453,471, 5,462,999, 5,616,661, 5,627,242, 5,665,818, 5,668,228 and 5,677,375; and EP 0 794 200 A1; EP 0 802 202 A1; and EP 634 421 B1. Information relating to methods of introducing liquid catalyst systems into fluidized bed polymerizations into a particle lean zone can be found in disclosures including, but not limited to U.S. Pat. No. 5,693,727. Further information on slurry polymerization processes can be found in disclosures including, but not limited to U.S. Pat. No. 3,248,179 and U.S. Pat. No. 4,613,484. WO 1996/08520 and U.S. Pat. No. 5,712,352 are non-limiting examples of disclosures which describe a polymerization process operated in the absence of or essentially free of any scavengers.

The amount of terpolymer present in the elastomeric composition can range from a lower limit of 1, 5, 10, or 15 phr to an upper limit of 100, 60, 50, 40, 35, 30, 25 or 20 phr.

Blend Rubbers

The blend rubber can be any other elastomer, such as, for example, a general purpose rubber in one embodiment. A general purpose rubber, often referred to as a commodity rubber, may be any rubber that usually provides high strength and good abrasion along with low hysteresis and high resilience. These elastomers require antidegradants in the mixed compound because they generally have poor resistance to both heat and ozone. They are often easily recognized in the market because of their low selling prices relative to specialty elastomers and their big volumes of usage as described by School in RUBBER TECHNOLOGY COMPOUNDING AND TESTING FOR PERFORMANCE, p. 125 (Dick, ed., Hanser, 2001).

Examples of general purpose rubbers include NR, IR, SBR, polybutadiene rubber ("BR"), IBR, and SIBR, and mixtures thereof. EPM and EPDM and their mixtures, often are also referred to as general purpose elastomers.

In one embodiment, the blend rubber is selected NR, IR, SBR, BR, IBR, SIBR, butyl rubber, SBBR, poly(isobutylene-co-alkylstyrene), EPM, EPDM, and the like, preferably NR. In an embodiment, the blend rubber can include a mixture of at least two of these elastomers, preferably a mixture of NR and BR.

Natural rubbers are described in detail by Subramaniam in RUBBER TECHNOLOGY, p. 179-208 (Morton, ed., Chapman & Hall, 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D11646.

In another embodiment, the elastomeric composition may also comprise a BR. The Mooney viscosity of the BR as measured at 100° C. (ML 1+4) may range from 35 to 70, from 40 to about 65 in another embodiment, and from 45 to 60 in yet another embodiment. Commercial examples of these synthetic rubbers useful in the present invention are sold under the trade name BUDENE™ (Goodyear Chemical Company, Akron, Ohio), BUNA™ (Lanxess Inc., Samia, Ontario, Canada), and Diene™ (Firestone Polymers LLC, Akron, Ohio). An example is high cis-polybutadiene (cis-BR). By "cis-polybutadiene" or "high cis-polybutadiene," it is meant that 1,4-cis polybutadiene is used, wherein the amount of cis component is at least 95%. A particular example of high cis-polybutadiene commercial products used in the composition BUDENE™ 1207 or BUNA™ CB 23.

In another embodiment, the elastomeric composition may also comprise a IR. The Mooney viscosity of the polyisoprene rubber as measured at 100° C. (ML 1+4) may range from 35 to 70, from 40 to about 65 in another embodiment, and from 45 to 60 in yet another embodiment. A commercial example of these synthetic rubbers useful in the present invention is NATSYN™ 2200 (Goodyear Chemical Company, Akron, Ohio).

In another embodiment, the elastomeric composition may also comprise rubbers of ethylene and propylene derived units such as EPM and EPDM as suitable additional rubbers. Examples of suitable comonomers in making EPDM are ethylidene norbornene, 1,4-hexadiene, dicyclopentadiene, as well as others. A suitable ethylene-propylene rubber is commercially available as VISTALON™ (ExxonMobil Chemical Company, Houston, Tex.).

In another embodiment, the blend rubber can include special purpose elastomers such as isobutylene-based homopolymers or copolymers known as butyl rubbers. These polymers can be described as random copolymers of a $C_4$ to $C_7$ isomonoolefin derived unit, such as isobutylene derived unit, and at least one other polymerizable unit. Butyl rubbers can be prepared by reacting a mixture of monomers, the mixture having at least (1) a $C_4$ to $C_7$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin.

The isoolefin is a $C_4$ to $C_7$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in U.S. Pat. No. 5,162,425. Other polymerizable monomers such as styrene and dichlorostyrene are also suitable for homopolymerization or copolymerization in butyl rubbers. One embodiment of the butyl rubber polymer can be obtained by reacting 95 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. Nos. 2,356,128, 3,968,076, 4,474, 924, 4,068,051 and 5,532,312. See, also, WO 2004/058828, WO 2004/058827, WO 2004/058835, WO 2004/058836, WO 2004/058825, WO 2004/067577 and WO 2004/058829.

A commercial example of a desirable butyl rubber is EXXON™ BUTYL Grades of poly(isobutylene-co-isoprene), having a Mooney viscosity of from 32±2 to 51±5 (ML 1+8 at 125° C.) (ExxonMobil Chemical Company, Houston, Tex.). Another commercial example of a desirable butyl-type rubber is VISTANEX™ polyisobutylene rubber having a molecular weight viscosity average of from $0.9\pm0.15\times10^6$ to $2.11\pm0.23\times10^6$ (ExxonMobil Chemical Company, Houston, Tex.).

Another embodiment of a blend rubber useful in the invention is a branched or star-branched butyl rubber. These rubbers are described in, for example, EP 0 678 529 B1, U.S. Pat. No. 5,182,333 and U.S. Pat. No. 5,071,913. In one embodiment, the SBBR is a composition of a butyl rubber, either halogenated or not, and a polydiene or block copolymer, either halogenated or not. The invention is not limited by the method of forming the SBBR. The polydienes/block copolymer, or branching agents (hereinafter "polydienes"), are typically cationically reactive and are present during the polymerization of the butyl or halogenated butyl rubber, or can be blended with the butyl rubber to form the SBBR. The branching agent or polydiene can be any suitable branching agent, and the invention is not limited to the type of polydiene used to make the SBBR.

In one embodiment, the SBBR can be a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, EPDM, EPR, styrene-butadiene-styrene and styrene-isoprene-styrene block copolymers. These polydienes are present, based on the monomer wt %, greater than 0.3 wt % in one embodiment, and from 0.3 to 3 wt % in another embodiment, and from 0.4 to 2.7 wt % in yet another embodiment. A commercial embodiment of the SBBR of the present invention is SB Butyl 4266 (ExxonMobil Chemical Company, Houston, Tex.), having a Mooney viscosity (ML 1+8 at 125° C., ASTM D 1646) of from 34 to 44. Further, cure characteristics of SB Butyl 4266 are as follows: MH is 69±6 dN·m, ML is 11.5±4.5 dN·m (ASTM D2084).

In an embodiment, the blend rubber can include halogenated butyl rubber. Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,554,326, 4,681,921, 4,650,831, 4,384,072, 4,513,116 and 5,681,901. In one embodiment, the butyl rubber is halogenated in hexane diluent at from 4° C. to 60° C. using bromine ($Br_2$) or chlorine ($Cl_2$) as the halogenation agent. The halogenated butyl rubber has a Mooney Viscosity of from 20 to 70 (ML 1+8 at 125° C.) in one embodiment, and from 25 to 55 in another embodiment. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1 to 2.5 wt %.

A commercial embodiment of a halogenated butyl rubber is Bromobutyl 2222 (ExxonMobil Chemical Company, Houston, Tex.). Its Mooney viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084). Another commercial embodiment of the halogenated butyl rubber is Bromobutyl 2255 (ExxonMobil Chemical Company, Houston, Tex.). Its Mooney viscosity is from 41 to 51 (ML 1+8 at 125° C., ASTM D1646), and the bromine content is from 1.8 to 2.2 wt %. Further, cure characteristics of Bromobutyl 2255 are as follows: MH is from 34 to 48 dN·m, ML is from 11 to 21 dN·m (ASTM D2084).

The blend rubbers in the present invention may also comprise at least one random copolymer comprising a $C_4$ to $C_7$ isomonoolefins, such as isobutylene and an alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. In another embodiment, the polymer may be a random elastomeric copolymer of ethylene or a $C_3$ to $C_6$ α-olefin and an alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as polymers containing the following monomer units randomly spaced along the polymer chain:

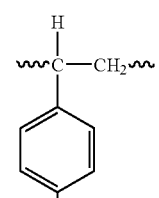

(1)

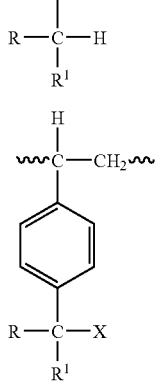

(2)

wherein R and $R^1$ are independently hydrogen, lower alkyl, such as a $C_1$ to $C_7$ alkyl and primary or secondary alkyl halides and X is a functional group such as halogen. In an embodiment, R and $R^1$ are each hydrogen. Up to 60 mol % of the para-substituted styrene present in the random polymer structure may be the functionalized structure (2) above in one embodiment, and in another embodiment from 0.1 to 5 mol %. In yet another embodiment, the amount of functionalized structure (2) is from 0.2 to 3 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof.

These functionalized isomonoolefin copolymers, their method of preparation, methods of functionalization, and cure are more particularly disclosed in U.S. Pat. No. 5,162,445. In an embodiment, the elastomer comprises random polymers of isobutylene and para-methylstyrene containing from 0.5 to 20 mol % para-methylstyrene wherein up to 60 mol % of the methyl substituent groups present on the benzyl ring contain a bromine or chlorine atom, such as a bromine atom (para-(bromomethylstyrene)), as well as acid or ester functionalized versions thereof. In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow MWD ($M_w/M_n$) of less than 5, alternatively less than 2.5, an exemplary viscosity average molecular weight ("$M_v$") in the range of from 200,000 up to 2,000,000 and an exemplary $M_n$ in the range of from 25,000 to 750,000 as determined by GPC.

The random copolymer may be prepared by a slurry polymerization, typically in a diluent comprising a halogenated hydrocarbon(s) such as a chlorinated hydrocarbon and/or a fluorinated hydrocarbon including mixtures thereof, (see e.g., WO 2004/058828, WO 2004/058827, WO 2004/058835, WO 2004/058836, WO 2004/058825, WO 2004/067577, and WO 2004/058829), of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

In an embodiment, brominated poly(isobutylene-co-p-methylstyrene) ("BIMSM") polymers generally contain from 0.1 to 5% mole of bromomethylstyrene groups relative to the total amount of monomer derived units in the copolymer. In another embodiment, the amount of bromomethyl groups is from 0.2 to 3.0 mol %, and from 0.3 to 2.8 mol % in yet another embodiment, and from 0.4 to 2.5 mol % in yet another embodiment, and from 0.3 to 2.0 in yet another embodiment, wherein a desirable range may be any combination of any upper limit with any lower limit. Expressed another way, exemplary copolymers contain from 0.2 to 10 wt % of bromine, based on the weight of the polymer, from 0.4 to 6 wt % bromine in another embodiment, and from 0.6 to 5.6 wt % in another embodiment, are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from 0.4 to 3.0 mol % based on the total number of para-methylstyrene, and wherein the para-methylstyrene derived units are present from 3 to 15 wt % based on the total weight of the polymer in one embodiment, and from 4 to 10 wt % in another embodiment. In another embodiment, the para-(halomethylstyrene) is para-(bromomethylstyrene).

A commercial embodiment of the halogenated isobutylene-p-methylstyrene rubber of the present invention is EXXPRO™ elastomers (ExxonMobil Chemical Company, Houston, Tex.), having a Mooney viscosity (ML 1+8 at 125° C., ASTM D1646) of from 30 to 50, a p-methylstyrene content of from 4 to 8.5 wt %, and a bromine content of from 0.7 to 2.2 wt % relative to the halogenated isobutylene-p-methylstyrene rubber.

In one embodiment, the blend rubber can also include a specialty rubber containing a polar functional group such as butadiene-acrylonitrile rubber (NBR, or nitrile rubber), a copolymer of 2-propenenitrile and 1,3-butadiene. Nitrile rubber can have an acrylonitrile content of from 10 to 50 wt % in one embodiment, from 15 to 40 wt % in another embodiment, and from 18 to 35 wt % in yet another embodiment. The Mooney viscosity may range from 30 to 90 in one embodiment (1+4, 100° C., ASTM D-1646), and from 30 to 75 in another embodiment. These rubbers are common in the art, and described in, for example, HANDBOOK OF PLASTICS, ELASTOMERS, AND COMPOSITES 1.41-1.49 (Harper, ed., McGraw-Hill, Inc. 1992). Commercial examples of these synthetic rubbers useful in the present invention are sold under the trade names BREON™, NIPOL™, SIVIC™ and ZETPOL™ (Zeon Chemicals, Louisville, Ky.), EUROPRENE™ N (Polimeri Europa Americas, Houston, Tex.), and KRYNAC™, PERBUNAN™ and THERBAN™ (Lanxess Corporation, Akron, Ohio).

In another embodiment, the blend rubber can include a derivative of NBR such as hydrogenated or carboxylated or styrenated nitrile rubbers. Butadiene-acrylonitrile-styrene rubber, a copolymer of 2-propenenitrile, 1,3-butadiene and styrene, can have an acrylonitrile content of from 10 to 40 wt % in one embodiment, from 15 to 30 wt % in another embodiment, and from 18 to 30 wt % in yet another embodiment. The styrene content of the SNBR copolymer may range from 15 wt % to 40 wt % in one embodiment, and from 18 wt % to 30 wt % in another embodiment, and from 20 to 25 wt % in yet another embodiment. The Mooney viscosity may range from 30 to 60 in one embodiment (1+4, 100° C., ASTM D1646), and from 30 to 55 in another embodiment. These rubbers are common in the art, and described in, for example, HANDBOOK OF PLASTICS, ELASTOMERS, AND COMPOSITES 1.41-1.49 (Harper, ed., McGraw-Hill, Inc. 1992). A commercial example of this synthetic rubber useful in the present invention is sold under the trade name KRYNAC™ (Lanxess Corporation, Akron, Ohio).

In yet another embodiment, the blend rubber can include a specialty rubber containing a halogen group such as polychloroprene ("CR" or "chloroprene rubber"), a homopolymer of 2-chloro-1,3-butadiene. The Mooney viscosity may range from 30 to 110 in one embodiment (1+4, 100° C., ASTM D-1646), and from 35 to 75 in another embodiment. These rubbers are common in the art, and described in, for example, HANDBOOK OF PLASTICS, ELASTOMERS, AND COMPOSITES 1.41-1.49 (Harper, ed., McGraw-Hill, Inc. 1992). Commercial examples of these synthetic rubbers useful in the present invention are sold under the trade names NEOPRENE™ (DuPont Dow Elastomers, Wilmington, Del.), BUTACLOR™ (Polimeri Europa Americas, Houston, Tex.) and BAYPREN™ (Lanxess Corporation, Akron, Ohio).

In another embodiment, the elastomeric compositions may comprise at least one thermoplastic resin. Thermoplastic resins suitable for practice of the present invention may be used singly or in combination and are resins containing nitrogen, oxygen, halogen, sulfur or other groups capable of interacting with an aromatic functional groups such as halogen or acidic groups. The resins are present in the nanocomposite from 30 to 90 wt % of the nanocomposite in one embodiment, and from 40 to 80 wt % in another embodiment, and from 50 to 70 wt % in yet another embodiment. In yet another embodiment, the resin is present at a level of greater than 40 wt % of the nanocomposite, and greater than 60 wt % in another embodiment.

Suitable thermoplastic resins include resins selected from the group consisting or polyamides, polyimides, polycarbonates, polyesters, polysulfones, polylactones, polyacetals, acrylonitrile-butadiene-styrene resins ("ABS"), polyphenyleneoxide ("PPO"), polyphenylene sulfide ("PPS"), polystyrene, styrene-acrylonitrile resins ("SAN"), styrene maleic anhydride resins ("SMA"), aromatic polyketones ("PEEK," "PED," and "PEKK") and mixtures thereof.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethyleneadipamide (nylon-6,6) polyhexamethyleneazelamide (nylon-6,9), polyhexamethylenesebacamide (nylon-6,10), polyhexamethylene-isophthalamide (nylon-6, IP) and the condensation product of 11-amino-undecanoic acid (nylon-11) and the like. Commercially available thermoplastic polyamides (especially those having a softening point below 275° C.) may be advantageously used in the practice of this invention, with linear crystalline polyamides having a softening point or melting point between 160 and 260° C. being preferred.

Suitable thermoplastic polyesters which may be employed include the polymer reaction products of one or a mixture of aliphatic or aromatic polycarboxylic acids esters of anhydrides and one or a mixture of diols. Examples of satisfactory polyesters include poly (trans-1,4-cyclohexylene $C_{2-6}$ alkane dicarboxylates such as poly(trans-1,4-cyclohexylene succinate) and poly(trans-1,4-cyclohexylene adipate); poly(cis or trans-1,4-cyclohexanedimethylene)alkanedicarboxylates such as poly(cis-1,4-cyclohexanedimethylene)oxalate and poly-(cis-1,4-cyclohexanedimethylene)succinate, poly($C_{2-4}$ alkylene terephthalates) such as polyethyleneterephthalate and polytetramethylene-terephthalate, poly($C_{2-4}$ alkylene isophthalates such as polyethyleneisophthalate and polytetramethylene-isophthalate and like materials. Preferred polyesters are derived from aromatic dicarboxylic acids such as naphthalenic or phthalic acids and $C_2$ to $C_4$ diols, such as polyethylene terephthalate and polybutylene terephthalate. Preferred polyesters will have a melting point in the range of 160° C. to 260° C.

Poly(phenylene ether) ("PPE") thermoplastic resins which may be used in accordance with this invention are well known, commercially available materials produced by the oxidative coupling polymerization of alkyl substituted phenols. They are generally linear, amorphous polymers having a glass transition temperature in the range of 190° C. to 235° C. These polymers, their method of preparation and compositions with polystyrene are further described in U.S. Pat. No. 3,383,435.

Other thermoplastic resins which may be used include the polycarbonate analogs of the polyesters described above such as segmented poly(ether co-phthalates); polycaprolactone polymers; styrene resins such as copolymers of styrene with less than 50 mol % of acrylonitrile ("SAN") and ABS; sulfone polymers such as polyphenyl sulfone; copolymers and homopolymers of ethylene and $C_2$ to $C_8$ α-olefins, in one embodiment a homopolymer of propylene derived units, and in another embodiment a random copolymer or block copolymer of ethylene derived units and propylene derived units, and like thermoplastic resins as are known in the art.

The total amount of blend rubber present in the elastomeric composition can range from a lower limit of 40, 50, 60, 65, 70 or 75 phr to an upper limit of 85, 90, 95, or 99 phr. In one embodiment, the blend rubber can comprise NR in a proportion from a lower limit of 10, 20, 30, 40, or 45 percent by weight to an upper limit of 55, 60, 70, 80, 90, 95, or 100 percent by weight of the total blend rubber. In an embodiment, the blend rubber can be a mixture of NR and another blend rubber such as BR, wherein the NR and BR can each be independently present in the elastomeric composition from a lower limit of 5, 10, 20, 25, 30, or 35 phr to an upper limit of 40, 45, 50, or 60 phr.

Other Components

The elastomeric compositions may also include a variety of other components and may be optionally cured to form cured elastomeric compositions that ultimately are fabricated into end use articles. For example, the elastomeric compositions may optionally comprise: a) at least one filler, for example, calcium carbonate, clay, mica, silica, silicates, talc, titanium dioxide, starch, wood flower, carbon black, or mixtures thereof, b) at least one clay, for example, montmorillonite, nontronite, beidellite, volkonskoite, laponite, hectorite, saponite, sauconite, magadite, kenyaite, stevensite, vermiculite, halloysite, aluminate oxides, hydrotalcite, or mixtures thereof, optionally, treated with modifying agents; c) at least one processing oil, for example, aromatic oil, naphthenic oil, paraffinic oil, or mixtures thereof, d) at least one processing aid, for example, plastomer, polybutene, polyalphaolefin oils, or mixtures thereof, e) at least one cure package or curative or wherein the composition has undergone at least one process to produce a cured composition; f) any combination of a-e.

Plastomers suitable for use in the present invention in certain embodiments can be described as polyolefin copolymers having a density of from 0.85 to 0.915 g/cm$^3$ and a melt index (MI) between 0.10 and 30 dg/min. In one embodiment, the plastomers are copolymers of ethylene derived units and at least one of $C_3$ to $C_{10}$ α-olefin derived units, the copolymers having a density in the range of less than 0.915 g/cm$^3$. The amount of comonomer ($C_3$ to $C_{10}$ α-olefin derived units) present in the plastomer can range from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

The plastomer may have a MI@190° C. of between 0.10 and 20 dg/min in one embodiment, and from 0.2 to 10 dg/min in another embodiment, and from 0.3 to 8 dg/min in yet another embodiment. The average molecular weight of the plastomers can range from 10,000 to 800,000 in one embodiment, and from 20,000 to 700,000 in another embodiment. The 1% secant flexural modulus (ASTM D-790) of the plastomers can range from 10 MPa to 150 MPa in one embodiment, and from 20 MPa to 100 MPa in another embodiment. Further, the plastomer can have a Tm of from 50° C. to 62° C. (first melt peak) and from 65° C. to 85° C. (second melt peak) in one embodiment, and from 52° C. to 60° C. (first melt peak) and from 70° C. to 80° C. (second melt peak) in another embodiment.

Plastomers can be metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm$^3$ in one embodiment. The MWD ($M_w/M_n$) of desirable plastomers can range from 2 to 5 in one embodiment, and from 2.2 to 4 in another embodiment. Examples of commercially available plastomers are EXACT™ 4150, a copolymer of ethylene and 1-hexene, the 1-hexene derived units making up from 18 to 22 wt % of the plastomer and having a density of 0.895 g/cm$^3$ and MI of 3.5 dg/min (ExxonMobil Chemical Company, Houston, Tex.); and EXACT™ 8201, a copolymer of ethylene and 1-octene, the 1-octene derived units making up from 26 to 30 wt % of the plastomer, and having a density of 0.882 g/cm$^3$ and MI of 1.0 dg/min (ExxonMobil Chemical Company, Houston, Tex.).

In one embodiment, a polybutene processing oil may be present in the composition. In one embodiment, the polybutene processing oil can be a low molecular weight (less than 15,000 $M_n$) homopolymer or copolymer of olefin derived units having from 3 to 8 carbon atoms in one embodiment, preferably from 4 to 6 carbon atoms in another embodiment. In yet another embodiment, the polybutene is a homopolymer or copolymer of a $C_4$ raffinate. An embodiment of such low molecular weight polymers termed "polybutene" polymers is described in, for example, SYNTHETIC LUBRICANTS AND HIGH-PERFORMANCE FUNCTIONAL FLUIDS, pp. 357-392 (Rudnick & Shubkin, ed., Marcel Dekker 1999) (hereinafter "polybutene processing oil" or "polybutene").

In one embodiment of the invention, the polybutene processing oil is a copolymer of at least isobutylene derived units, 1-butene derived units, and 2-butene derived units. In one embodiment, the polybutene is a homopolymer, copolymer, or terpolymer of the three units, wherein the isobutylene derived units are from 40 to 100 wt % of the copolymer, the 1-butene derived units are from 0 to 40 wt % of the copolymer, and the 2-butene derived units are from 0 to 40 wt % of the copolymer. In another embodiment, the polybutene is a copolymer or terpolymer of the three units, wherein the isobutylene derived units are from 40 to 98 wt % of the copolymer, the 1-butene derived units are from 2 to 40 wt % of the copolymer, and the 2-butene derived units are from 0 to 30 wt % of the copolymer. In yet another embodiment, the polybutene is a terpolymer of the three units, wherein the isobutylene derived units are from 40 to 96 wt % of the copolymer, the 1-butene derived units are from 2 to 40 wt % of the copolymer, and the 2-butene derived units are from 2 to 20 wt % of the copolymer. In yet another embodiment, the polybutene is a homopolymer or copolymer of isobutylene and 1-butene, wherein the isobutylene derived units are from 65 to 100 wt % of the homopolymer or copolymer, and the 1-butene derived units are from 0 to 35 wt % of the copolymer.

Polybutene processing oils can have a $M_n$ of less than 10,000 in one embodiment, less than 8000 in another embodiment, and less than 6000 in yet another embodiment. In one embodiment, the polybutene oil has a $M_n$ of greater than 400, and greater than 700 in another embodiment, and greater than 900 in yet another embodiment. A preferred embodiment can be a combination of any lower molecular weight limit with any upper molecular weight limit herein. For example, in one embodiment of the polybutene of the invention, the polybutene has a $M_n$ of from 400 to 10,000, and from 700 to 8000 in another embodiment, and from 900 to 3000 in yet another embodiment. Useful viscosities of the polybutene processing oil ranges from 10 to 6000 cSt (centiStokes) at 100° C. in one embodiment, and from 35 to 5000 cSt at 100° C. in another embodiment, and is greater than 35 cSt at 100° C. in yet another embodiment, and greater than 100 cSt at 100° C. in yet another embodiment.

Commercial examples of such a processing oil are the PARAPOL™ Series of processing oils (ExxonMobil Chemical Company, Houston, Tex.), such as PARAPOL™ 450, 700, 950, 1300, 2400 and 2500. The commercially available PARAPOL™ Series of polybutene processing oils are synthetic liquid polybutenes, each individual formulation having a certain molecular weight, all formulations of which can be used in the composition of the invention. The molecular weights of the PARAPOL™ oils are from 420 Mn (PARAPOL™ 450) to 2700 Mn (PARAPOL™ 2500) as determined by GPC. The MWD of the PARAPOL™ oils range from 1.8 to 3 in one embodiment, and from 2 to 2.8 in another embodiment.

The elastomeric composition of the invention may include one or more types of polybutene as a mixture, blended with addition of the terpolymer to blend rubber, or preblended with either the terpolymer or blend rubber. The amount and identity (e.g., viscosity, Mn, etc.) of the polybutene processing oil mixture can be varied in this manner. Thus, PARAPOL™ 450 can be used when low viscosity is desired in the composition, while PARAPOL™ 2500 can be used when a higher viscosity is desired, or compositions thereof to achieve some other viscosity or molecular weight. In this manner, the physical properties of the composition can be controlled. More particularly, the phrases "polybutene processing oil," or "polybutene processing oil" include a single oil or a composition of two or more oils used to obtain any viscosity or molecular weight (or other property) desired, as specified in the ranges disclosed herein.

The polybutene processing oil or oils are present in the elastomeric composition of the invention from 1 to 60 phr in one embodiment, and from 2 to 40 phr in another embodiment, from 4 to 35 phr in another embodiment, and from 5 to 30 phr in yet another embodiment, and from 2 to 10 phr in yet another embodiment, and from 5 to 25 phr in yet another embodiment, and from 2 to 20 phr in yet another embodiment, wherein a desirable range of polybutene may be any upper phr limit combined with any lower phr limit described herein. Preferably, the polybutene processing oil does not contain aromatic groups or unsaturation.

Processing aids can also be selected from commercially available compounds such as so called isoparaffins, polyalphaolefins ("PAOs") and polybutenes (a subgroup of PAOs). These three classes of compounds can be described as paraffins which can include branched, cyclic, and normal structures, and blends thereof. These processing aids can be described as comprising $C_6$ to $C_{200}$ paraffins in one embodiment, and $C_8$ to $C_{100}$ paraffins in another embodiment.

Other processing aids can include esters, polyethers, and polyalkylene glycols. Other processing aids may be present or used in the manufacture of the elastomeric compositions of the invention. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, polybutene aids, naphthenic oils, aromatic oils, waxes, resins, rosins, and the like.

The processing aid is typically present or used in the manufacturing process from 1 to 70 phr in one embodiment, from 3 to 60 phr in another embodiment, and from 5 to 50 phr in yet another embodiment.

The elastomeric composition may have one or more filler components such as, for example, calcium carbonate, silica, clay and other silicates which may or may not be exfoliated, talc, titanium dioxide, and carbon black. The fillers may be any size and typically range, for example, from about 0.0001 μm to about 100 μm. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

In one embodiment, the filler can be carbon black or modified carbon black, and combinations of any of these. In another embodiment, the filler can be a blend of carbon black and silica. The preferred filler for such articles as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, p. 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N326, N330, N347, N351, N550, N660, and N762. Carbon blacks suitable for innerliners and other air barriers include N550, N660, N650, N762, N990 and REGAL™ 85.

The layered filler may comprise a layered clay, optionally, treated or pre-treated with a modifying agent such as organic molecules. The elastomeric compositions may incorporate a clay, optionally, treated or pre-treated with a modifying agent, to form a nanocomposite or nanocomposite composition. Nanocomposites may include at least one elastomer as described above and at least one modified layered filler. The modified layered filler may be produced by the process comprising contacting at least one layered filler such as at least one layered clay with at least one modifying agent. The modified layered filler may be produced by methods and using equipment well within the skill in the art. For example, see U.S. Pat. Nos. 4,569,923, 5,663,111, 6,036,765 and 6,787,592.

In an embodiment, the layered filler such as a layered clay may comprise at least one silicate. In certain embodiments, the silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are smectite-clays prepared synthetically, e.g., by hydrothermal processes as disclosed in U.S. Pat. Nos. 3,252,757, 3,586,468, 3,666,407, 3,671,190, 3,844,978, 3,844,979, 3,852,405 and 3,855,147. In other embodiments, the at least one silicate may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered filler such as the layered clays described above may be modified such as intercalated or exfoliated by treatment with at least one modifying agent or swelling agent or exfoliating agent or additive capable of undergoing ion exchange reactions with the cations present at the interlayer surfaces of the layered filler. Modifying agents are also known as swelling or exfoliating agents. Generally, they are additives capable of undergoing ion exchange reactions with the cations present at the interlayer surfaces of the layered filler. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene. In other embodiments, a class of exfoliating additives can include those which can be covalently bonded to the interlayer surfaces. These include polysilanes of the structure $-Si(R^5)_2R^6$ where $R^5$ is the same or different at each occurrence and is selected from alkyl, alkoxy or oxysilane and $R^6$ is an organic radical compatible with the matrix polymer of the composite. Other suitable exfoliating additives can include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734 and 4,889,885 as well as WO 1992/02582.

Examples of some commercial products are Cloisites produced by Southern Clay Products, Inc. in Gonzales, Tex. For example, Cloisite Na⁺, Cloisite 30B, Cloisite 10A, Cloisite 25A, Cloisite 93A, Cloisite 20A, Cloisite 15A, and Cloisite 6A. They are also available as SOMASIF™ and LUCENTITE™ clays produced by CO-OP Chemical Co., LTD. In Tokyo, Japan. For example, SOMASIF™ MAE, SOMASIF™ MEE, SOMASIF™ MPE, SOMASIF™ MTE, SOMASIF™ ME-100, LUCENTITE™ SPN, and LUCENTITE™ (SWN).

The amount of clay or exfoliated clay incorporated in the nanocomposites in accordance with an embodiment of the invention is sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber, the clay or exfoliated clay may be present from 1 to 30 phr in one embodiment, and from 5 to 20 phr in another embodiment.

In certain embodiments, the elastomeric compositions and the articles made from those compositions may comprise or be manufactured with the aid of at least one cure package, at least one curative, at least one crosslinking agent, and/or undergo a process to cure the elastomeric composition. As used herein, at least one curative package refers to any material or method capable of imparting cured properties to a rubber as commonly understood in the industry. At least one curative package may include any and at least one of sulfur, zinc oxide, and fatty acids. Peroxide cure systems or resin cure systems may also be used. Further, heat or radiation-induced crosslinking of polymers may be used.

One or more crosslinking agents are preferably used in the elastomeric compositions of the present invention, especially when silica is the primary filler, or is present in combination with another filler. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco)

and the like, and mixtures thereof. In one embodiment, bis-(3-triethoxysilypropyl)tetrasulfide (known commercially as "Si69") is employed.

Generally, polymer blends, for example, those used to produce tires, are crosslinked to thereby improve the polymer's mechanical properties. It is known that the physical properties, performance characteristics, and durability of vulcanized rubber compounds are directly related to the number (crosslink density) and type of crosslinks formed during the vulcanization reaction. Sulfur is the most common chemical vulcanizing agent for diene-containing elastomers. It exists as a rhombic 8-member ring or in amorphous polymeric forms. The sulfur vulcanization system also consists of the accelerator to activate the sulfur, an activator, and a retarder to help control the induction time. Accelerators serve to control the induction time and rate of vulcanization, and the number and type of sulfur crosslinks that are formed. These factors play a significant role in determining the performance properties of the vulcanizate.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Retarders may be used to increase the cure induction time to allow sufficient time to process the unvulcanized rubber.

Halogen-containing elastomers such as halogenated star-branched butyl rubber, brominated butyl rubber, chlorinated butyl rubber, star-branched brominated butyl (polyisobutylene/isoprene copolymer) rubber, halogenated poly(isobutylene-co-p-methylstyrene), polychloroprene, and chlorosulfonated polyethylene may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction.

Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK™ products from E.I. du Pont de Nemours and Co.). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, the entire available curative is consumed in the formation of effective crosslinks which join together two polymer chains and enhance the overall strength of the polymer matrix. Numerous accelerators are known in the art and include, but are not limited to, the following: stearic acid, diphenyl guanidine ("DPG"), tetramethylthiuram disulfide ("TMTD"), 4,4'-dithiodimorpholine ("DTDM"), tetrabutylthiuram disulfide ("TBTD"), benzothiazyl disulfide ("MBTS"), hexamethylene-1,6-bisthiosulfate disodium salt dihydrate (sold commercially as DURALINK™ HTS by Flexsys), 2-morpholinothio benzothiazole ("MBS" or "MOR"), blends of 90% MOR and 10% MBTS (MOR90), N-tertiarybutyl-2-benzothiazole sulfenamide ("TBBS"), and N-oxydiethylene thiocarbamyl-N-oxydiethylene sulfonamide ("OTOS"), zinc 2-ethyl hexanoate ("ZEH"), and "thioureas."

The compositions produced in accordance with the present invention typically contain other components and additives customarily used in rubber mixes, such as effective amounts of other nondiscolored and nondiscoloring processing aids, pigments, antioxidants, and/or antiozonants.

Processing

Blends of elastomers may be reactor blends and/or melt mixes. Mixing of the components may be carried out by combining the polymer components, filler and any clay in the form of an intercalate in any suitable mixing device such as a two-roll open mill, BRABENDER™ internal mixer, BANBURY™ internal mixer with tangential rotors, KRUPP™ internal mixer with intermeshing rotors, or preferably a mixer/extruder, by techniques known in the art. Mixing is performed at temperatures in the range from up to the melting point of the elastomer and/or secondary rubber used in the composition in one embodiment, from 40° C. up to 250° C. in another embodiment, and from 100° C. to 200° C. in yet another embodiment, under conditions of shear sufficient to allow the clay intercalate to exfoliate and become uniformly dispersed within the polymer to form the nanocomposite.

Typically, from 70% to 100% of the elastomer or elastomers is first mixed for 20 to 90 seconds, or until the temperature reaches from 40° C. to 75° C. Then, three quarters of the filler, and the remaining amount of elastomer, if any, are typically added to the mixer, and mixing continues until the temperature reaches from 90° C. to 150° C. Next, the remaining filler is added, as well as the processing oil, and mixing continues until the temperature reaches from 140° C. to 190° C. The masterbatch mixture is then finished by sheeting on an open mill and allowed to cool, for example, to from 60° C. to 100° C. when the curatives are added.

Mixing with clays is performed by techniques known to those skilled in the art, wherein the clay is added to the polymer at the same time as the carbon black in one embodiment. The polybutene processing oil is typically added later in the mixing cycle after the carbon black and clay have achieved adequate dispersion in the elastomeric matrix.

The cured compositions of the invention can include various elastomers and fillers with the polybutene processing oil. The compositions of the invention typically include isobutylene-based elastomers such as halogenated poly(isobutylene-co-p-methylstyrene), butyl rubber, or halogenated star-branched butyl rubber ("HSBBR") either alone, or some combination with one another, with the polybutene processing oil being present from 5 to 30 phr in one embodiment.

The elastomeric compositions of the invention may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. The elastomeric compositions may either be fabricated into a finished article or a component of a finished article such as a sidewall for a tire. Additionally, the elastomeric compositions may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

In yet other applications, the elastomer(s) or elastomeric compositions of the invention are also useful in chewing-gum, as well as in medical applications such as pharmaceutical stoppers and closures, coatings for medical devices, and the arts for paint rollers.

EXAMPLES

The abbreviations in appended Table 1 are used in the examples. In the examples below, the following compounding procedures were used. A BANBURY™ 1-liter laboratory mixer was used with a recommended fill factor of 75% for the first pass, 70% for the final pass. For the first pass, the mixer was set at 80 rpm, the ram pressure at 410 kPa (60 psi), and the chamber temperature at 50° C. After running a warm-up batch, the rubbers were added, the ram lowered, two-thirds of the carbon black was added at 30 seconds, and the remaining carbon black, oils, and any other powders added at 60 seconds. All compounds had a drop temperature of 160° C. and a mix time target of 5 minutes (300 seconds). At the end of the first stage, the compound temperature, mix time, batch weight, and any available power integrator data (energy) were recorded.

For the final mixing stage, the mixer was set at 30-40 rpm, the ram pressure at 275 kPa (40 psi) and the chamber temperature at 40° C. After checking the first pass cut down weight, half of the first pass material, any powders, and then the remaining first pass material were added and the ram lowered. The drop temperature was 100°-105° C. and the mix time target was 90 seconds but never exceeded two minutes maximum. At the end of the final stage, the compound temperature, mix time, batch weight, and any available power integrator data (energy) were recorded.

Cure times for compounded samples are typically set by measuring t90 with an MDR rheometer, +2 minutes (i.e. time to 90% of optimum cure state), at 160° C. For mill sheets, the compound was added to the mill, and 12 cross cuts were performed followed by 12 pig rolls, keeping the compound cool with a maximum dwell time on the mill of 5 minutes.

Examples 1-3

Three samples of an ethylene-propylene-diene terpolymer having isotactic polypropylene crystallinity were used to develop a tire sidewall composition. The properties of the terpolymer samples are listed in Table 2:

TABLE 2

Terpolymer Composition and Rheology

| Sample | $C_2$ (wt %) | $C_3$ (wt %) | ENB (wt %) | MFR (dg/min) |
|---|---|---|---|---|
| TS-1 | 16.30 | 81.70 | 2.00 | 3.6 |
| TS-2 | 13.40 | 84.60 | 2.00 | 3.8 |
| TS-3 | 9.40 | 88.65 | 1.95 | 4.4 |

The three terpolymer samples were evaluated in a tire model black sidewall compound. Such compounds are typically blends of polybutadiene and natural rubber. Tire sidewalls are nominally 50/50 blends of NR and BR, the industry standard to optimize fatigue resistance. The terpolymer samples were added at 20 phr, replacing 10 phr each of NR and BR. The recipes for the sidewall compounds are given in Table 3, and compound property data are summarized in Table 4, both appended below. From the results illustrated in Table 4, it is evident that addition of the terpolymer according to the invention leads to an improvement in higher tack, increased fatigue resistance, and resistance to ozone cracking, i.e., no cracks under the test conditions.

The compounds were then aged for 3 and 7 days at 100° C. to determine the effects of heat aging. These properties are important for commercial truck tires which undergo very long service lives (up to 500,000 miles) and are retreaded up to three times. Resistance to degradation of properties is important because of the high heat history (retreading cure temperatures) and long environmental exposure. Table 5 appended below illustrates the effect of aging on the tensile strength of the model sidewall compounds. From the data in Table 5, it is seen that addition of the terpolymer leads to an improvement in aged tensile properties: percent retention (higher) and percent change (lower).

Example 4

Tire sidewall staining is in many instances due to the blooming of 6PPD to the surface. A three variable designed experiment considering the respective proportions of terpolymer TS-1, 6PPD, and oil was run to look at the effect of reducing 6PPD and improving color and appearance qualities. A design space approach as illustrated in FIG. 1 was used to develop a statistical model to determine the effects of varying amounts of terpolymer, oil and 6PPD, with independent variables varied within the limits shown in Table 6.

TABLE 6

Design Space Limits

| Variable | Minimum | Maximum |
|---|---|---|
| TS-1, phr | 10 | 30 |
| Oil, phr | 3 | 12 |
| 6PPD, phr | 0.5 | 4.5 |

This three-variable standard central composite design was used to develop compound test data. The data were imported to SAS JMP statistical software and regression equations were calculated with the software using the relationship:

$$\text{Dependent Variable} = aX + bY + cZ + dX^2 + eY^2 + fZ^2 + gXy + hXZ + jYZ + \text{constant}$$

The terms X, Y and Z represent the three independent variables and the coefficients "a" to "j" represent a measure of their significance in determining the dependent variable response. This quadratic model also allows identification of any potential material interactions, and the squared terms can help describe response patterns of the dependent variables that may not be linear. Furthermore, the 3-factor central composite design to which this relationship is suited uses 15 runs or compounds and is more economical than a full factorial design which may use up to 27 runs. The tabulated data are presented in Table 7 appended below.

Figure 2A:
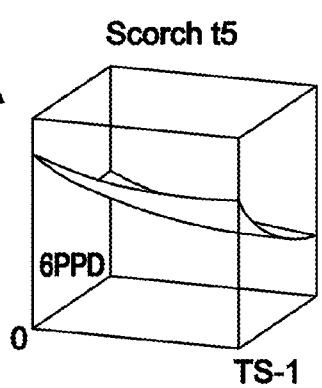
FIGS. 2A through 2F are contour diagrams showing the effects of varying amounts of terpolymer, oil and/or 6PPD anti-ozonant in the tire sidewall formulations of Example 4 on scorch time t5, rheometer t10, elongation, tack, percent tensile retention (3 days heat aging), and percent tensile retention (7 days heat aging), respectively, according to an embodiment of the invention.
Figure 2B:
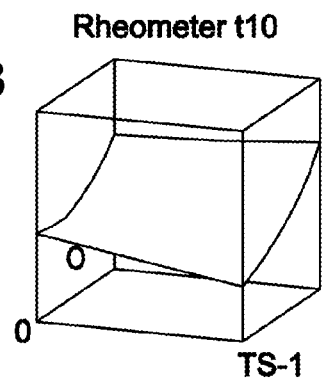
Figure 2C:
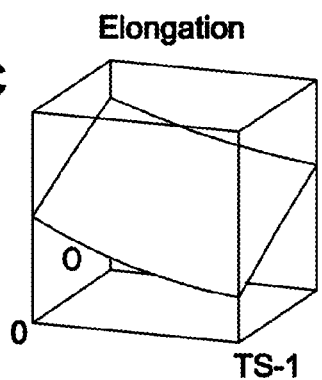
Figure 2D:
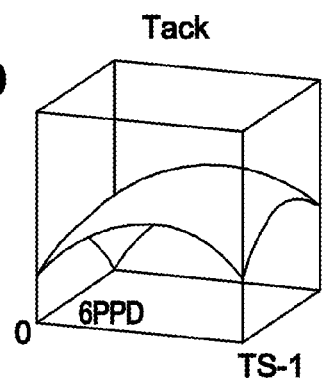
Figure 2E:
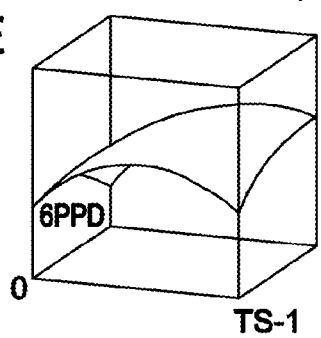
Figure 2F:
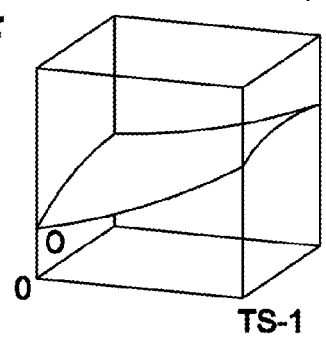

FIGS. 2A through 2F are contour plots constructed by the regression software from the data in Table 7, and collectively show improvements in tack (increased, FIG. 2D) and retention of tensile strength (higher) after aging at 100° C. for 3 days (FIG. 2E) and 7 days (FIG. 2F). Little effect on cure induction and scorch time were noted (FIG. 2B). The effect of the terpolymer TS-1 on aged tensile strength retention is much greater than the effect of 6PPD (FIGS. 2E and 2F).

Figure 3:
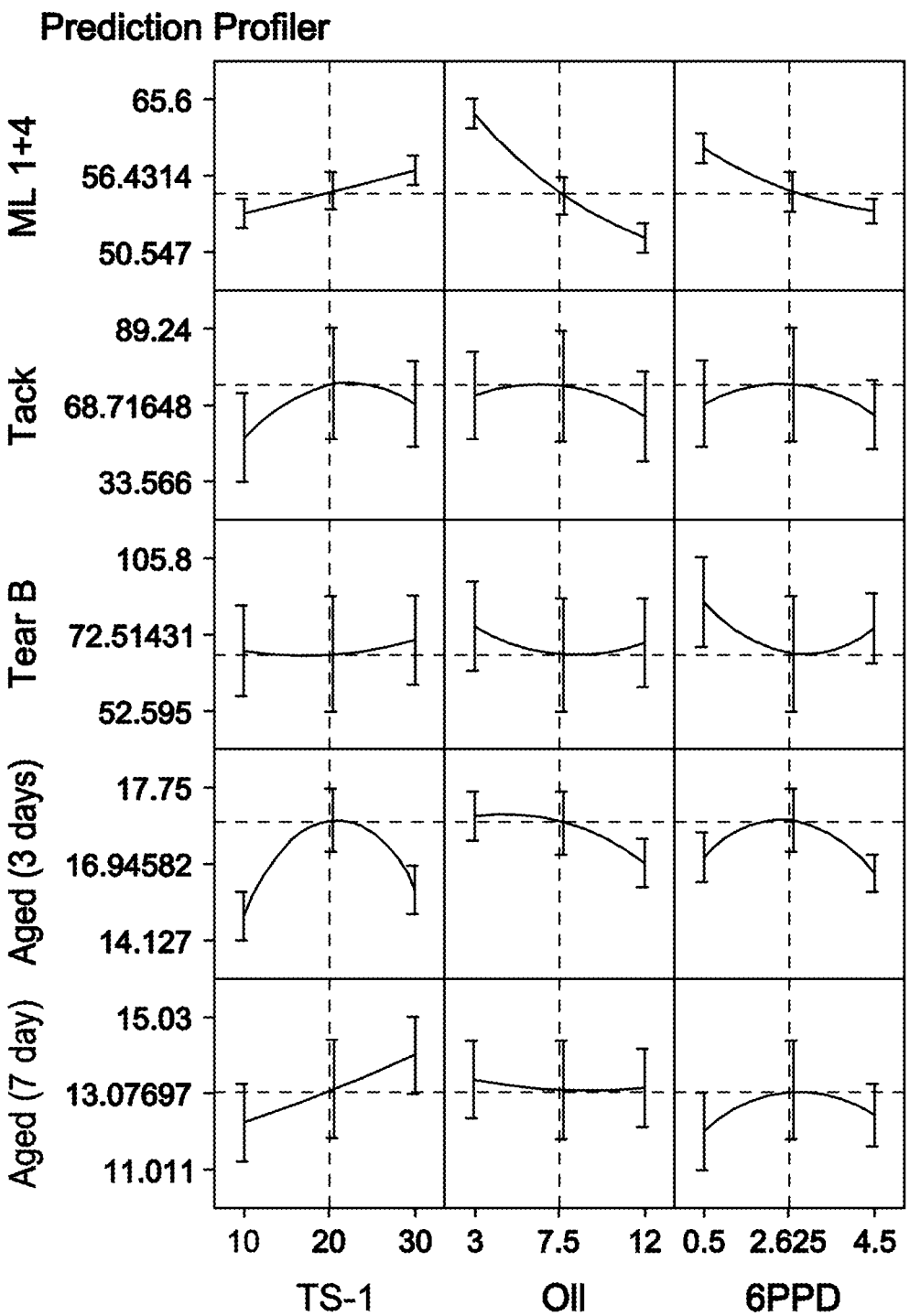
FIG. 3 illustrates prediction profiler composite graphs for the midpoint of the design variables in the design space of the terpolymer-containing tire sidewall formulations of Example 4, according to an embodiment of the invention.
Figure 4:
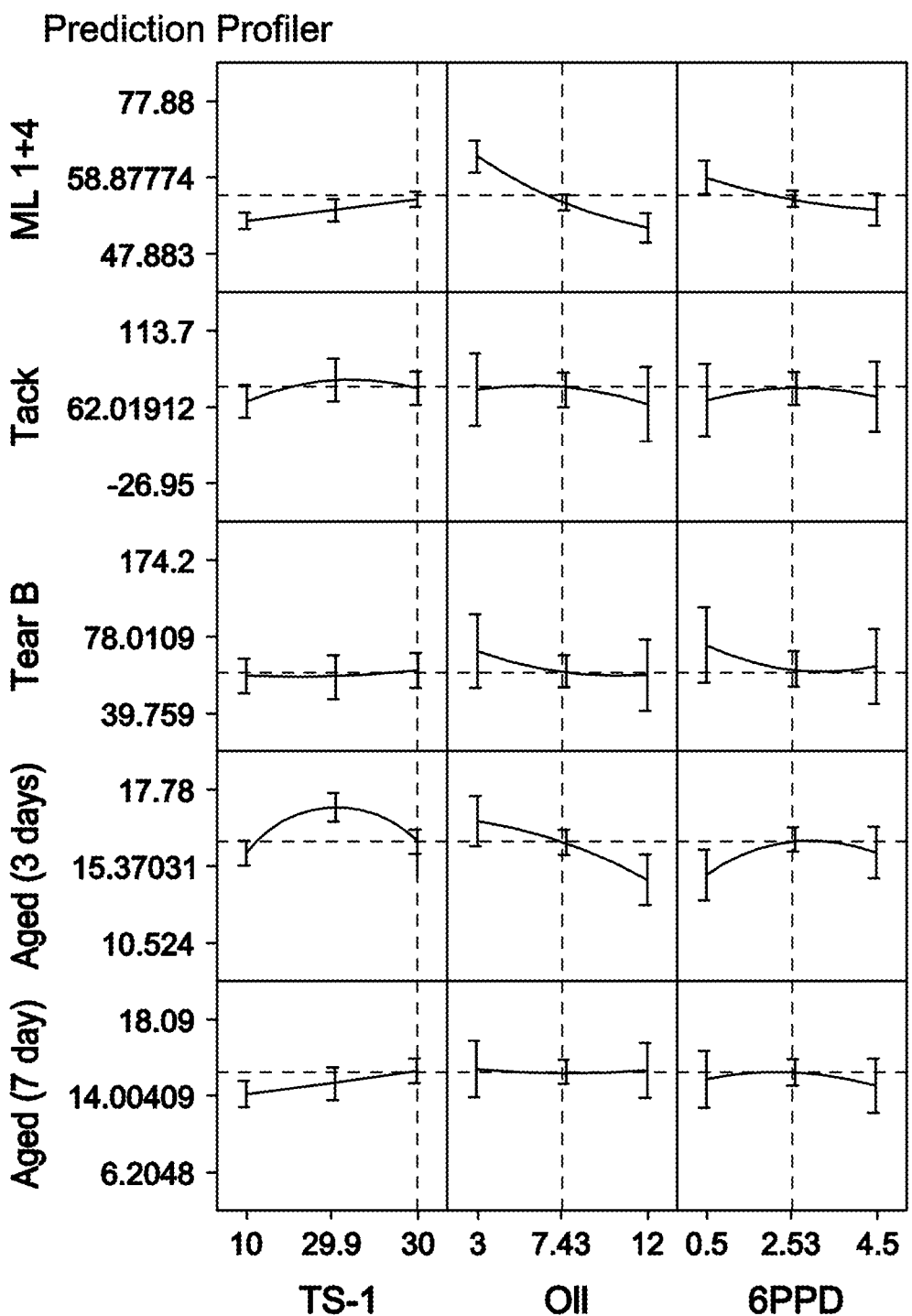
FIG. 4 illustrates prediction profiler composite graphs for the design space of the terpolymer-containing tire sidewall formulations of Example 4 to demonstrate the effect of increasing the terpolymer content toward the upper end of the terpolymer content variable of the design space, according to an embodiment of the invention.

Prediction profiler composite graphs are shown in FIG. 3 for the midpoint of the design variables, and in FIG. 4 to demonstrate the effect of increasing the terpolymer content toward the upper end of the design space, e.g. an increase in TS-1 content led to improvements in aged tensile strength. Similarly, an increase in TS-1 content can lead to an improvement in fatigue resistance, e.g. endpoint fatigue life (thousand cycles, kC). The optimum level of the terpolymer TS-1 is in the range of 20 to 25 phr.

Example 5

Four samples listed in Table 8 were evaluated in a standard screening formulation, including three terpolymer samples, TS-4, TS-5 and TS-6, and a conventional EPDM commercially available under the trade designation V2727 for comparison purposes. This enabled a comparative study between high propylene, low ethylene terpolymer and a high ethylene EPDM terpolymer.

TABLE 8

Properties of Samples in Standard Screening Formulation

| Sample | Mooney, ML 1 + 4, 125° C. | MFR @ 230° C., 2.16 kg (g/10 min) | C$_2$ content, (FTIR) wt % | ENB content, (FTIR) wt % |
|---|---|---|---|---|
| TS-4 | 18.0 | 4.0 | 16.0 | 2.4 |
| TS-5 | 26.0 | 0.9 | 16.0 | 2.6 |
| TS-6 | 29.0 | 0.6 | 19.0 | 2.5 |
| V 2727 EPDM | 44.0 | — | 57.0 | 2.2 |

The compounding formulations for screening are listed in Table 9, and the formulation properties are presented in Table 10. Demattia cut growth data are also presented in Table 11.

The terpolymers show comparable mechanical properties such as tensile strength and tear strength relative to the EPDM rubber. Moreover, the inventive terpolymer samples with ethylene contents in the range of 16%, when compared to EPDM rubber with ethylene content in the range of 57%, show lower compression set, better peel adhesion performance, and better (slower) cut growth.

Example 6

Figure 5:
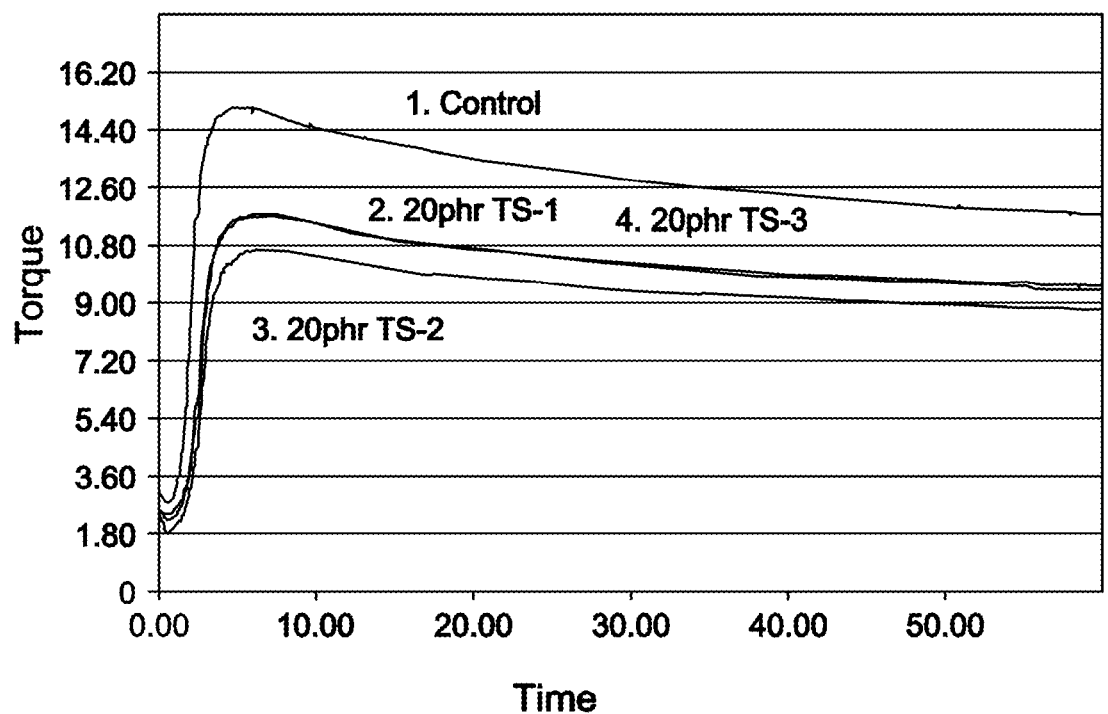
FIG. 5 shows the rheometer profiles for three terpolymer grades according to the present invention compared to the control in the screening formulations of Example 6.

The terpolymer samples TS-1, TS-2 and TS-3 (Table 2) were also evaluated in the tire model black sidewall compound (Table 3) for reversion resistance. FIG. 5 shows the rheometer profiles for the three terpolymer grades compared to the control. The time for the control compound to revert by 2 torque units (approx 15 minutes) compares to the compounds containing 20 phr terpolymer which took over 30 minutes to revert (longer is better). The reversion resistance of white sidewall compounds containing the terpolymers was similarly evaluated and a similar directional improvement in reversion resistance was found with inventive terpolymer addition.

All patents, patent publications, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

When numerical lower limits and numerical upper limits are listed herein, ranges from any lower limit to any upper limit are contemplated.

TABLE 1

Abbreviations

| Abbreviation | Compound (Function) |
|---|---|
| NR | Natural Rubber |
| BR | Polybutadiene or Butadiene Rubber |
| EPDM | Ethylene Propylene Diene Monomer |
| ENB | 2-Ethylidene-5-norbornene |
| N330 | Carbon black (ASTM designation) |
| SP1068 | Phenolic tackifying resin |
| ZnO | Zinc Oxide |
| 6PPD | N-1,3-Dimethylbutyl-N'-phenyl-p-phenylene diamine (antiozonant) |
| TMQ | 2,2,4-Trimethyl-1,2-dihydroquinoline polymer (antioxidant) |
| DPTTS | Dipentamethylenethiuram tetrasulfide (secondary accelerator) |
| TBBS | tert-Butyl-2-benzothiazole sulfenamide (primary accelerator) |
| ZDBDC | Zinc dibutyldithiocarbamate (secondary accelerator) |

TABLE 3

Composition of Model Sidewall Compounds

| Material | C-1 (phr) | C-2 (phr) | C-3 (phr) | C-4 (phr) |
|---|---|---|---|---|
| NR | 50.00 | 40.00 | 40.00 | 40.00 |
| BR | 50.00 | 40.00 | 40.00 | 40.00 |
| TS-1 | | 20.00 | | |
| TS-2 | | | 20.00 | |
| TS-3 | | | | 20.00 |
| N330 | 50.00 | 50.00 | 50.00 | 50.00 |
| Aromatic Oil | 10.00 | 10.00 | 10.00 | 10.00 |
| Wax | 1.50 | 1.50 | 1.50 | 1.50 |
| TMQ | 1.00 | 1.00 | 1.00 | 1.00 |
| 6PPD | 3.00 | 3.00 | 3.00 | 3.00 |
| SP1068 | 2.00 | 2.00 | 2.00 | 2.00 |
| Stearic acid | 2.00 | 2.00 | 2.00 | 2.00 |
| ZnO | 3.00 | 3.00 | 3.00 | 3.00 |
| Sulfur | 2.00 | 2.00 | 2.00 | 2.00 |
| TBBS | 1.00 | 1.00 | 1.00 | 1.00 |

TABLE 4

Properties of Model Sidewall Compounds

| Property | C-1 | C-2 | C-3 | C-4 |
|---|---|---|---|---|
| Composition | | | | |
| NR, phr | 50.00 | 40.00 | 40.00 | 40.00 |
| BR, phr | 50.00 | 40.00 | 40.00 | 40.00 |
| TS-1, phr | | 20.00 | | |
| TS-2, phr | | | 20.00 | |
| TS-3, phr | | | | 20.00 |
| Compounding Properties | | | | |
| ML 1 + 4 @ 100° C., MU | 50.00 | 53.6 | 55.2 | 46.2 |
| Mooney Scorch 5 pt. min (125° C.) | 18.7 | 17.6 | 17.8 | 18.0 |

TABLE 4-continued

Properties of Model Sidewall Compounds

| Property | C-1 | C-2 | C-3 | C-4 |
|---|---|---|---|---|
| MDR Rheometer: 160° C. | | | | |
| MH-ML, dN · m | 13.9 | 12.2 | 11.5 | 12.2 |
| Tc10, minutes | 2.4 | 2.4 | 2.5 | 2.3 |
| Tc90, minutes | 4.9 | 5.2 | 5.2 | 4.8 |
| Original Basic Mechanical Properties | | | | |
| Tensile Strength, MPa | 20.4 | 19.3 | 21.3 | 20.3 |
| Elongation, % | 560 | 510 | 510 | 535 |
| 300% Modulus, MPa | 8.9 | 11.2 | 12.5 | 10.4 |
| Hardness, Shore A | 60 | 69 | 73 | 72 |
| Tear Strength, kN/M (Die B) | 82.9 | 79.0 | 89.6 | 66.4 |
| TEL Tack, Average kg/cm² (lbs/in²) | 3.4 (48) | 4.4 (63) | 5.3 (76) | 4.6+ (65+) |
| Fatigue to Failure, Average kC | 15.2 | 46.1 | 93.7 | 63.0 |
| Ozone Resistance, Static, 20% Extension, 50 pphm | | | | |
| 50 hrs | Cracked | NC | NC | NC |
| 100 hrs | Cracked | NC | NC | NC |
| 150 hrs | Cracked | NC | NC | NC |

NC = No cracks

TABLE 5

Aged Properties of Model Sidewall Compounds

| Property | C-1 | C-2 | C-3 | C-4 |
|---|---|---|---|---|
| Composition | | | | |
| NR, phr | 50.00 | 40.00 | 40.00 | 40.00 |
| BR, phr | 50.00 | 40.00 | 40.00 | 40.00 |
| TS-1, phr | | 20.00 | | |
| TS-2, phr | | | 20.00 | |
| TS-3, phr | | | | 20.00 |
| Aged Physical Properties (3 days @100° C.) | | | | |
| Tensile Strength, MPa | 16.0 | 16.6 | 17.5 | 17.7 |
| Aged Physical Properties (7 days @100° C.) | | | | |
| Tensile Strength, MPa | 10.6 | 13.1 | 11.3 | 13.3 |
| Aged Tensile Strength Retention (3 days @100° C.) | | | | |
| % Retention | 78.3 | 86.0 | 82.2 | 87.0 |
| % Change (ASTM D573) | 21.6 | 14.0 | 17.8 | 13.0 |
| Aged Tensile Strength Retention (7 days @100° C.) | | | | |
| % Retention | 52.0 | 69.0 | 53.2 | 55.4 |
| % Change (ASTM D573) | 48.0 | 32.0 | 46.8 | 34.6 |

TABLE 7

Tabulated Data for Compounds C-5 through C-20

| | C-5 | C-6 | C-7 | C-8 | C-9 | C-10 | C-11 | C-12 |
|---|---|---|---|---|---|---|---|---|
| TS-1, phr | 20.00 | 14.00 | 26.00 | 14.00 | 26.00 | 14.00 | 26.00 | 14.00 |
| Aromatic Oil, phr | 7.50 | 4.80 | 4.80 | 10.20 | 10.20 | 4.80 | 4.80 | 10.20 |
| 6PPD, phr | 4.50 | 1.30 | 1.30 | 1.30 | 1.30 | 3.70 | 3.70 | 3.70 |
| ML 1 + 4 @100° C. | 54.7 | 62.1 | 65.1 | 55.2 | 56.9 | 57.5 | 60.2 | 51.4 |
| Scorch 5 pt (min) | 15.5 | 17.4 | 16.5 | 19.0 | 18.3 | 16.0 | 14.6 | 17.1 |
| MH-ML (dN · m) | 12.3 | 14.7 | 14.0 | 13.3 | 12.0 | 13.9 | 13.3 | 12.3 |
| Ts10 (min) | 2.1 | 2.2 | 2.2 | 2.3 | 2.3 | 2.1 | 2.0 | 2.1 |
| Tc'90 (min) | 4.2 | 4.3 | 4.5 | 4.5 | 4.5 | 4.1 | 4.0 | 4.2 |
| CRI | 48.1 | 46.5 | 44.2 | 45.9 | 43.9 | 49.5 | 49.3 | 48.5 |
| TEL TACK | 56 | 53 | 61 | 52 | 48 | 53 | 59 | 54 |
| Fatigue to Failure | 67.0 | 31.0 | 19.0 | 35.7 | 24.6 | 74.3 | 13.8 | 42.6 |
| Abrasion (cm³) | 0.35 | 0.28 | 0.41 | 0.32 | 0.40 | 0.33 | 0.43 | 0.31 |
| Tear Strength (kN/m) | 77.1 | 78.6 | 84.0 | 75.5 | 76.9 | 76.0 | 82.1 | 80.6 |
| Peel adhesion | 7.3 | 11.4 | 4.9 | 10.3 | 5.0 | 10.6 | 5.1 | 12.7 |
| Tensile Strength, MPa | 20.2 | 19.9 | 19.4 | 20.1 | 18.9 | 18.6 | 19.4 | 19.7 |
| Elongation, % | 485 | 460 | 407 | 515 | 470 | 485 | 430 | 550 |
| 300% Modulus, MPa | 12.4 | 13.6 | 15.4 | 11.6 | 13.2 | 10.6 | 14.3 | 10.3 |
| Hardness, Shore A | 69 | 70 | 76 | 68 | 73 | 69 | 75 | 65 |
| G' × 10⁻⁶ | 21.13 | 22.08 | 31.49 | 19.51 | 28.58 | 20.63 | 29.54 | 18.10 |
| Aged Tensile (3 days), MPa | 15.5 | 16.0 | 16.1 | 16.1 | 15.4 | 15.5 | 17.1 | 15.2 |
| Aged Elongation (3 days), % | 280 | 235 | 220 | 265 | 245 | 260 | 245 | 315 |
| Aged Tensile (7 days), MPa | 11.9 | 12.2 | 13.4 | 11.1 | 12.7 | 12.6 | 13.4 | 12.9 |
| Aged Elongation (7 days), % | 165 | 155 | 140 | 150 | 150 | 165 | 145 | 205 |
| Aged Tensile Retention (3 days), % | 77 | 81 | 83 | 80 | 82 | 83 | 88 | 77 |
| Aged Tensile Retention (7 days), % | 59 | 61 | 69 | 55 | 67 | 68 | 69 | 65 |

| | C-13 | C-14 | C-15 | C-16 | C-17 | C-18 | C-19 | C-20 |
|---|---|---|---|---|---|---|---|---|
| TS-1, phr | 26.00 | 100.0 | 30.00 | 20.00 | 20.00 | 20.00 | 20.00 | 20.00 |
| Aromatic Oil, phr | 7.50 | 10.20 | 7.50 | 7.50 | 3.00 | 12.00 | 7.50 | 7.50 |
| 6PPD, phr | 3.70 | 2.50 | 2.50 | 2.50 | 2.50 | 2.50 | 0.50 | 4.50 |
| ML 1 + 4 @100° C. | 54.7 | 52.5 | 54.1 | 59.4 | 64.4 | 52.2 | 56.6 | 54.7 |
| Scorch 5 pt (min) | 15.5 | 15.5 | 16.4 | 17.4 | 15.9 | 15.0 | 18.0 | 16.4 |
| MH-ML (dN · m) | 12.3 | 12.3 | 11.0 | 13.9 | 12.3 | 14.6 | 11.5 | 13.5 |
| Ts10 (min) | 2.1 | 2.1 | 2.1 | 2.1 | 2.1 | 2.0 | 2.3 | 2.1 |
| Tc'90 (min) | 4.2 | 4.2 | 4.3 | 4.2 | 4.5 | 4.2 | 4.4 | 4.4 |
| CRI | 45.0 | 48.3 | 42.2 | 46.5 | 45.9 | 43.9 | 42.7 | 47.2 |
| TEL TACK | 62 | 51 | 69 | 72 | 59 | 67 | 73 | 57 |
| Fatigue to Failure | 67.0 | 67.0 | 57.5 | 60.6 | 17.3 | 33.5 | 52.4 | 31.4 |

TABLE 7-continued

Tabulated Data for Compounds C-5 through C-20

| Abrasion (cm³) | 0.35 | 0.35 | 0.40 | 0.28 | 0.42 | 0.37 | 0.37 | 0.32 |
|---|---|---|---|---|---|---|---|---|
| Tear Strength (kN/m) | 77.1 | 77.1 | 67.7 | 75.5 | 86.0 | 85.1 | 83.6 | 70.6 |
| Peel adhesion | 7.3 | 7.3 | 4.7 | 15.7 | 3.1 | 4.2 | 5.0 | 5.2 |
| Tensile Strength, MPa | 20.2 | 20.2 | 17.3 | 20.8 | 19.4 | 20.5 | 19.9 | 19.8 |
| Elongation, % | 485 | 485 | 500 | 520 | 465 | 430 | 520 | 480 |
| 300% Modulus, MPa | 12.4 | 12.4 | 10.1 | 11.3 | 14.0 | 14.9 | 11.2 | 13.1 |
| Hardness, Shore A | 69 | 72 | 66 | 76 | 74 | 69 | 72 | 73 |
| $G' \times 10^{-6}$ | 25.29 | 18.53 | 32.80 | 25.79 | 22.59 | 24.13 | 24.72 | 20.38 |
| Aged Tensile (3 days), MPa | 15.5 | 15.5 | 14.9 | 14.5 | 15.4 | 16.7 | 16.2 | 17.0 |
| Aged Elongation (3 days), % | 280 | 280 | 300 | 270 | 230 | 235 | 305 | 265 |
| Aged Tensile (7 days), MPa | 11.9 | 11.9 | 13.6 | 12.3 | 14.2 | 13.4 | 13.4 | 13.0 |
| Aged Elongation (7 days), % | 165 | 165 | 190 | 175 | 150 | 145 | 195 | 160 |
| Aged Tensile Retention (3 days), % | 77 | 77 | 86 | 70 | 79 | 81 | 81 | 86 |
| Aged Tensile Retention (7 days), % | 59 | 59 | 78 | 59 | 73 | 65 | 67 | 66 |

TABLE 9

Composition of Screening Formulations

| Compound | C-21 (phr) | C-22 (phr) | C-23 (phr) | C-24 (phr) |
|---|---|---|---|---|
| TS-4 | 100.0 | | | |
| TS-5 | | 100.0 | | |
| TS-6 | | | 100.0 | |
| V 2727 EPDM | | | | 100.0 |
| N 330 Black | 50.0 | 50.0 | 50.0 | 50.0 |
| FLEXON 815 Oil | 10.0 | 10.0 | 10.0 | 10.0 |
| Zinc Oxide | 5.0 | 5.0 | 5.0 | 5.0 |
| Stearic Acid | 1.5 | 1.5 | 1.5 | 1.5 |
| DPTTS | 0.8 | 0.8 | 0.8 | 0.8 |
| ZDBDC | 0.5 | 0.5 | 0.5 | 0.5 |

TABLE 10

Properties of Screening Formulations (Cured at 170° C. for 20 Minutes)

| Compound | C-21 | C-22 | C-23 | C-24 |
|---|---|---|---|---|
| Screening Sample | TS-4 | TS-5 | TS-6 | V 2727 |
| $C_2$ Content, wt % | 16 | 16 | 19 | 57 |
| Mooney, ML 1 + 4, 125° C. | 18 | 26 | 29 | 44 |
| Tensile Strength, MPa | 14.6 | 16.1 | 15.6 | 16 |
| Elongation, % | 850 | 800 | 855 | 835 |
| 100% Modulus, MPa | 1.1 | 1.2 | 1 | 1.5 |
| Hardness, Shore A | 54 | 55 | 52 | 55 |
| Compression Set @ 70° C. × 72 hrs | 27.5 | 21.2 | 22.4 | 41.3 |
| Compression Set @ 100° C. × 72 hrs | 37.7 | 34 | 32.9 | 56.3 |
| Tension Set, Extension 100% at 23° C. × 10 mins | 12.8 | 17.2 | 8.9 | 7.8 |
| Die C Tear, kN/m | 41.4 | 48.9 | 43.1 | 48.1 |
| Die C Tear 70° C. kN/m | 22.5+ | 25.4 | 25.9 | 30 |
| Die C Tear 125° C. kN/m | 21.5+ | 20.7+ | 20.6+ | 23.3+ |
| Ozone Resistance Static, 25% Extension, 50 pphm 50, 100, 150 hrs | NC | NC | NC | NC |
| Peel Adhesion - Peel Strength, kg/cm | 3.1 | 2.6 | 3.2 | NAd |
| Failure Mode | Interfacial | Interfacial | Interfacial | NAd |

NC = No cracks
NAd = No adhesion

TABLE 11

Demattia Cut Growth for Screening Compounds

| Compound | C-21 | C-22 | C-23 | C-24 |
|---|---|---|---|---|
| Screening Sample | TS-4 | TS-5 | TS-6 | V 2727 |
| $C_2$ Content, wt % | 16 | 16 | 19 | 57 |
| Mooney, ML 1 + 4, 125° C. | 18 | 26 | 29 | 44 |
| Cycles, kC | | Cut Length (mm) | | |
| 1 | 2.2 | 2.3 | 2.3 | 2.6 |
| 3 | 2.8 | 2.7 | 2.6 | 3.1 |
| 5 | 3 | 2.8 | 2.7 | 3.8 |
| 10 | 3.1 | 3 | 2.8 | 4.3 |
| 20 | 3.4 | 3.2 | 3.3 | 5.6 |
| 40 | 3.7 | 3.3 | 3.5 | 6.1 |
| 60 | 3.9 | 3.5 | 3.6 | 6.4 |
| 80 | 4.2 | 3.6 | 3.7 | 6.6 |
| 100 | 4.6 | 3.7 | 4 | 7.1 |
| 120 | 4.9 | 3.8 | 4.3 | 7.4 |
| 140 | 5.3 | 4 | 4.7 | 7.7 |
| 160 | 5.6 | 4.1 | 5.4 | 8.1 |

TABLE 11-continued

Demattia Cut Growth for Screening Compounds

| 180 | 6 | 4.6 | 5.9 | 8.6 |
| 200 | 6.3 | 5 | 6.6 | 9.2 |

What is claimed is:

1. An elastomer composition comprising a blend of:
   (a) 15 to 25 phr of an ethylene-propylene-diene terpolymer comprising:
      at least 60 wt % propylene-derived units,
      from 0.5 to 20 wt % ethylene-derived units, and
      from 0.3 to 10 wt % diene-derived units, based on the total weight of propylene-derived units, ethylene-derived units, and diene-derived units,
      wherein the terpolymer has:
         isotactic propylene triad tacticity of 65 to 95%,
         a melting point by DSC equal to or less than 110° C., and
         a heat of fusion of from 5 J/g to 50 J/g;
   (b) 75 to 85 phr of a blend rubber selected from the group consisting of natural rubbers, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, poly(isobutylene-co-alkylstyrene), polychloroprene rubber, nitrile rubber and mixtures thereof;
   (c) 2 to 20 phr of polybutene processing oil, wherein the polybutene processing oil comprises from 40 to 98 wt % isobutylene derived units, from 2 to 40 wt % 1-butene derived units, and from 0 to 40 wt % 2-butene derived units; and
   (d) a secondary blend rubber comprising an ethylene-propylene-diene rubber having a crystallinity that is due to ethylene-derived sequences.

2. The elastomer composition of claim 1, wherein the terpolymer (a) comprises from 80 to 95 wt % of the propylene-derived units, from 6 to 20 wt % of the ethylene-derived units and from 0.5 to 4 wt % of the diene-derived units selected from 5-ethylidene-2-norbornene, 5-vinyl-2-norbornene, dicyclopentadiene and 1,4-hexadiene.

3. The elastomer composition of claim 1, wherein the terpolymer (a) has a Mooney viscosity ML(1+4) at 125° C. of from 1 to 100.

4. The elastomer composition of claim 1, wherein the terpolymer (a) has a tacticity index of from 6 to 8.

5. The elastomer composition of claim 1, wherein the blend rubber comprises natural rubber and polybutadiene rubber, wherein the natural rubber is present at from 5 to 80 phr and the polybutadiene rubber is present at from 5 to 80 phr relative to the total amount of terpolymer (a) and blend rubber.

6. The elastomer composition of claim 1, wherein the polybutene processing oil comprises from 40 to 96 wt % isobutylene derived units, from 2 to 40 wt % 1-butene derived units, and from 2 to 20 wt % 2-butene derived units.

7. The elastomer composition of claim 1, wherein the terpolymer (a) is partially insoluble in xylene at reflux, and wherein an ethylene content in a fraction of the terpolymer soluble in refluxing xylene at 23° C. and an ethylene content in a fraction of the terpolymer soluble in refluxing xylene at 31° C. differ by 5 wt % or less.

8. The elastomer composition of claim 1, wherein the polybutene processing oil has a molecular weight distribution ($M_w/M_n$) from 1.8 to 3.

9. The elastomer composition of claim 1, wherein the polybutene processing oil is present at 1 to 4 phr.

10. The elastomer composition of claim 1, wherein the polybutene processing oil comprises from 40 to 96 wt % isobutylene derived units, from 2 to 40 wt % 1-butene derived units, and from 2 to 20 wt % 2-butene derived units, wherein the polybutene processing oil has a molecular weight distribution ($M_w/M_n$) from 2 to 2.8, wherein the polybutene processing oil is present at 1 to 4 phr, wherein the terpolymer is partially insoluble in xylene at reflux, and wherein an ethylene content in a fraction of the terpolymer soluble in refluxing xylene at 23° C. and an ethylene content in a fraction of the terpolymer soluble in refluxing xylene at 31° C. differ by 5 wt % or less.

11. The elastomer composition of claim 1, wherein the ethylene-propylene-diene terpolymer (a) has a compression set from 21.2 to 27.5 at 70° C. and 72 hours.

12. The elastomer composition of claim 1, wherein the ethylene-propylene-diene terpolymer (a) has a compression set from 32.9 to 37.7 at 100° C. and 72 hours.

13. The elastomer composition of claim 1, wherein the ethylene-propylene-diene terpolymer (a) has a peel strength from 2.6 kg/cm to 3.2 kg/cm.

14. An article comprising a vulcanizate, wherein the vulcanizate comprises a blend of:
   (a) 15 to 25 phr of an ethylene-propylene-diene terpolymer comprising:
      at least 60 wt % propylene-derived units,
      from 0.5 to 20 wt % ethylene-derived units, and
      from 0.3 to 10 wt % diene-derived units, based on the total weight of propylene-derived units, ethylene-derived units, and diene-derived units,
      wherein the terpolymer has:
         isotactic propylene triad tacticity of 65 to 95%,
         a melting point by DSC equal to or less than 110° C., and
         a heat of fusion of from 5 J/g to 50 J/g;
   (b) 75 to 85 phr of a blend selected from the group consisting of natural rubbers, polyisoprene rubber, poly(styrene-co-butadiene) rubber, polybutadiene rubber, poly(isoprene-co-butadiene) rubber, styrene-isoprene-butadiene rubber, butyl rubber, star branched butyl rubber, poly(isobutylene-co-alkylstyrene), polychloroprene rubber, nitrile rubber and mixtures thereof;
   (c) a filler selected from carbon black, modified carbon black, silica, precipitated silica and blends thereof;
   (d) a chemical protectant selected from waxes, antioxidants, antiozonants and combinations thereof;
   (e) 2 to 20 phr of polybutene processing oil, wherein the polybutene processing oil comprises from 40 to 98 wt % isobutylene derived units, from 2 to 40 wt % 1-butene derived units, and from 0 to 40 wt % 2-butene derived units; and
   (f) a curing package; and
   (g) a secondary blend rubber comprising an ethylene-propylene-diene rubber having a crystallinity that is due to ethylene-derived sequences.
wherein the article is a tire or tire component.

15. The article of claim 14 wherein the blend comprises less than or equal to 4.5 phr of N,N'-disubstituted-para-phenyldiamines.

16. The article of claim 14 wherein the article is selected from the group consisting of a tire sidewall, a retreaded tire, a truck tire, an off-road tire, a passenger automobile tire, a bus tire, a motorcycle tire, and an aircraft tire.

17. A tire sidewall comprising
   from 15 to 25 phr ethylene-propylene-diene terpolymer-comprising from 80 to 95 wt % of propylene-derived units, from 5 to 20 wt % ethylene-derived units and from 0.5 to 4 wt % diene-derived units selected from 5-ethylidene-2-norbornene, 5-vinyl-2-norbornene, dicyclopentadiene, and 1,4-hexadiene, based on the total weight of propylene-derived units, ethylene-derived units and diene-derived units, wherein the terpolymer has a melting point by DSC equal to or less than 110° C., and a heat of fusion of from 5 J/g to 50 J/g, a Mooney viscosity ML(1+4) at 125° C. of from 5 to 40, and an isotactic propylene triad tacticity of from 65 to 95%;

from 35 to 45 phr natural rubber;

from 35 to 45 phr polybutadiene rubber;

a secondary blend rubber comprising an ethylene-propylene-diene rubber having a crystallinity that is due to ethylene-derived sequences;

an optional blend rubber selected from polyisoprene rubber (IR), poly(styrene-co-butadiene) rubber (SBR), poly(isoprene-co-butadiene) rubber (IBR), styrene-isoprene-butadiene rubber (SIBR), butyl rubber, star branched butyl rubber, poly(isobutylene-co-alkylstyrene), and mixtures thereof;

a filler selected from carbon black, modified carbon black, silica, precipitated silica, and blends thereof;

a chemical protectant selected from waxes, antioxidants, antiozonants and combinations thereof;

2 to 20 phr of polybutene processing oil, wherein the polybutene processing oil comprises from 40 to 98 wt % isobutylene derived units, from 2 to 40 wt % 1-butene derived units, and from 0 to 40 wt % 2-butene derived units; and a curing package.

* * * * *